(12) United States Patent
Hande et al.

(10) Patent No.: US 11,722,961 B2
(45) Date of Patent: Aug. 8, 2023

(54) DISCONTINUOUS RECEPTION SHORT CADENCE

(71) Applicant: QUALCOMM Incorporated, San Diego, CA (US)

(72) Inventors: Prashanth Haridas Hande, San Diego, CA (US); Peter Pui Lok Ang, San Diego, CA (US); Ravi Agarwal, San Diego, CA (US); Hyun Yong Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/378,056

(22) Filed: Jul. 16, 2021

(65) Prior Publication Data

US 2022/0330152 A1    Oct. 13, 2022

Related U.S. Application Data

(63) Continuation-in-part of application No. 17/301,650, filed on Apr. 9, 2021.

(51) Int. Cl.
*H04W 52/02* (2009.01)
*H04W 76/28* (2018.01)

(52) U.S. Cl.
CPC ....... *H04W 52/0232* (2013.01); *H04W 76/28* (2018.02)

(58) Field of Classification Search
CPC .......................... H04W 52/0232; H04W 76/28

USPC ......................................................... 370/318
See application file for complete search history.

(56) References Cited

U.S. PATENT DOCUMENTS

| 11,032,870 B2* | 6/2021 | Olvera-Hernandez ..................... H04W 4/70 |
| 2010/0111010 A1* | 5/2010 | Wu ........................ H04W 76/28 370/329 |
| 2010/0118815 A1* | 5/2010 | Kim ................... H04W 52/0216 370/328 |
| 2018/0035372 A1* | 2/2018 | Pradas .................. H04W 76/28 |
| 2019/0268965 A1 | 8/2019 | Jang et al. |
| 2022/0330377 A1 | 10/2022 | Hande et al. |

FOREIGN PATENT DOCUMENTS

WO    WO-2020060381 A1    3/2020

OTHER PUBLICATIONS

International Search Report and Written Opinion—PCT/US2022/071041—ISA/EPO—dated Jun. 23, 2022.

* cited by examiner

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, a user equipment (UE) may obtain a discontinuous reception (DRX) short cadence value that corresponds to a number of Hertz (Hz). The UE may sleep as part of a DRX cycle. The UE may wake up, starting at a subframe, based at least in part on the DRX short cadence value and a subframe identifier of the subframe. Numerous other aspects are described.

30 Claims, 19 Drawing Sheets

1100

48 Hz:

| Traffic | Short cadence | w/ slot offset |
|---|---|---|
| 20.833 | 20.000 | 20.750 |
| 41.667 | 41.000 | 41.625 |
| 62.500 | 62.000 | 62.500 |
| 83.333 | 83.000 | 83.250 |
| 104.167 | 104.000 | 104.125 |
| 125.000 | 125.000 | 125.000 |
| 145.833 | 145.000 | 145.750 |
| 166.667 | 166.000 | 166.625 |
| 187.500 | 187.000 | 187.500 |

60 Hz:

| Traffic | Short cadence | w/ slot offset |
|---|---|---|
| 16.667 | 16.000 | 16.625 |
| 33.333 | 33.000 | 33.250 |
| 50.000 | 50.000 | 50.000 |
| 66.667 | 66.000 | 66.625 |
| 83.333 | 83.000 | 83.250 |
| 100.000 | 100.000 | 100.000 |
| 116.667 | 116.000 | 116.625 |
| 133.333 | 133.000 | 133.250 |
| 150.000 | 150.000 | 150.000 |
| 166.667 | 166.000 | 166.625 |
| 183.333 | 183.000 | 183.250 |
| 200.000 | 200.000 | 200.000 |

80 Hz:

| Traffic | Short cadence | w/ slot offset |
|---|---|---|
| 12.500 | 12.000 | 12.500 |
| 25.000 | 25.000 | 25.000 |
| 37.500 | 37.000 | 37.500 |
| 50.000 | 50.000 | 50.000 |
| 62.500 | 62.000 | 62.500 |
| 75.000 | 75.000 | 75.000 |
| 87.500 | 87.000 | 87.500 |
| 100.000 | 100.000 | 100.000 |
| 112.500 | 112.000 | 112.500 |
| 125.000 | 125.000 | 125.000 |
| 137.500 | 137.000 | 137.500 |
| 150.000 | 150.000 | 150.000 |
| 162.500 | 162.000 | 162.500 |
| 175.000 | 175.000 | 175.000 |
| 187.500 | 187.000 | 187.500 |
| 200.000 | 200.000 | 200.000 |

90 Hz:

| Traffic | Short cadence | w/ slot offset |
|---|---|---|
| 11.111 | 11.000 | 11.000 |
| 22.222 | 22.000 | 22.125 |
| 33.333 | 33.000 | 33.250 |
| 44.444 | 44.000 | 44.375 |
| 55.556 | 55.000 | 55.500 |
| 66.667 | 66.000 | 66.625 |
| 77.778 | 77.000 | 77.750 |
| 88.889 | 88.000 | 88.875 |
| 100.000 | 100.000 | 100.000 |
| 111.111 | 111.000 | 111.000 |
| 122.222 | 122.000 | 122.125 |
| 133.333 | 133.000 | 133.250 |
| 144.444 | 144.000 | 144.375 |
| 155.556 | 155.000 | 155.500 |
| 166.667 | 166.000 | 166.625 |
| 177.778 | 177.000 | 177.750 |
| 188.889 | 188.000 | 188.875 |
| 200.000 | 200.000 | 200.000 |

FIG. 11

DISCONTINUOUS RECEPTION SHORT CADENCE

CROSS-REFERENCE TO RELATED APPLICATION

This patent application is a continuation-in-part of U.S. patent application Ser. No. 17/301,650, filed on Apr. 9, 2021, entitled "DISCONTINUOUS RECEPTION SHORT CADENCE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for using a short cadence value for discontinuous reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes obtaining a discontinuous reception (DRX) short cadence value that corresponds to a number of Hertz (Hz), sleeping as part of a DRX cycle, and waking up, starting at a subframe, based at least in part on the DRX short cadence value and a subframe identifier of the subframe.

In some aspects, a method of wireless communication performed by a base station includes preparing for communication with a UE according to a DRX short cadence value that corresponds to a number of Hz and transmitting, to the UE starting at a subframe, a data burst according to a DRX cycle that is based at least in part on the DRX short cadence value and a subframe identifier of the subframe.

In some aspects, a method of wireless communication performed by a UE includes obtaining a DRX short cadence value that corresponds to a number of Hz, sleeping as part of a DRX cycle, and waking up, starting at a slot, based at least in part on the DRX short cadence value and a slot identifier of the slot.

In some aspects, a method of wireless communication performed by a base station includes preparing for communication with a UE according to a DRX short cadence value that corresponds to Hz and transmitting, to the UE starting at a slot, a data burst according to a DRX cycle that is based at least in part on the DRX short cadence value and a slot identifier of the slot.

In some aspects, a UE for wireless communication includes memory and one or more processors coupled to the memory, the memory including instructions executable by the one or more processors to cause the UE to obtain a DRX short cadence value that corresponds to a number of Hz, sleep as part of a DRX cycle, and wake up, starting at a subframe, based at least in part on the DRX short cadence value and a subframe identifier of the subframe.

In some aspects, a base station for wireless communication includes memory and one or more processors coupled to the memory, the memory including instructions executable by the one or more processors to cause the base station to prepare for communication with a UE according to a DRX short cadence value that corresponds to a number of Hz and transmit, to the UE starting at a subframe, a data burst according to a DRX cycle that is based at least in part on the DRX short cadence value and a subframe identifier of the subframe.

In some aspects, a UE for wireless communication includes memory and one or more processors coupled to the memory, the memory including instructions executable by the one or more processors to cause the UE to obtain a DRX short cadence value that corresponds to a number of Hz, sleep as part of a DRX cycle, and wake up, starting at a slot, based at least in part on the DRX short cadence value and a slot identifier of the slot.

In some aspects, a base station for wireless communication includes memory and one or more processors coupled to the memory, the memory including instructions executable by the one or more processors to cause the base station to prepare for communication with a UE according to a DRX short cadence value that corresponds to Hz and transmit, to the UE starting at a slot, a data burst according to a DRX cycle that is based at least in part on the DRX short cadence value and a slot identifier of the slot.

In some aspects, a non-transitory computer-readable medium stores one or more instructions for wireless communication, the one or more instructions, when executed by one or more processors of a UE, cause the UE to obtain a DRX short cadence value that corresponds to a number of Hz, sleep as part of a DRX cycle, and wake up, starting at a subframe, based at least in part on the DRX short cadence value and a subframe identifier of the subframe.

In some aspects, a non-transitory computer-readable medium stores one or more instructions for wireless communication, the one or more instructions, when executed by one or more processors of a base station, cause the base station to prepare for communication with a UE according to a DRX short cadence value that corresponds to a number of Hz and transmit, to the UE starting at a subframe, a data burst according to a DRX cycle that is based at least in part on the DRX short cadence value and a subframe identifier of the subframe.

In some aspects, a non-transitory computer-readable medium stores one or more instructions for wireless communication, the one or more instructions, when executed by one or more processors of a UE, cause the UE to obtain a DRX short cadence value that corresponds to a number of Hz, sleep as part of a DRX cycle, and wake up, starting at a slot, based at least in part on the DRX short cadence value and a slot identifier k of the slot.

In some aspects, a non-transitory computer-readable medium stores one or more instructions for wireless communication, the one or more instructions, when executed by one or more processors of a base station, cause the base station to prepare for communication with a UE according to a DRX short cadence value that corresponds to Hz and transmit, to the UE starting at a slot, a data burst according to a DRX cycle that is based at least in part on the DRX short cadence value and a slot identifier of the slot.

In some aspects, an apparatus for wireless communication includes means for obtaining a DRX short cadence value that corresponds to a number of Hz, means for sleeping as part of a DRX cycle, and means for waking up, starting at a subframe, based at least in part on the DRX short cadence value and a subframe identifier of the subframe.

In some aspects, an apparatus for wireless communication includes means for preparing for communication with a UE according to a DRX short cadence value that corresponds to a number of Hz and means for transmitting, to the UE starting at a subframe, a data burst according to a DRX cycle that is based at least in part on the DRX short cadence value and a subframe identifier of the subframe.

In some aspects, an apparatus for wireless communication includes means for obtaining a DRX short cadence value that corresponds to a number of Hz, means for sleeping as part of a DRX cycle, and means for waking up, starting at a slot, based at least in part on the DRX short cadence value and a slot identifier of the slot.

In some aspects, an apparatus for wireless communication includes means for preparing for communication with a UE according to a DRX short cadence value that corresponds to Hz and means for transmitting, to the UE starting at a slot, a data burst according to a DRX cycle that is based at least in part on the DRX short cadence value and a slot identifier of the slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example of using different short cadence values, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
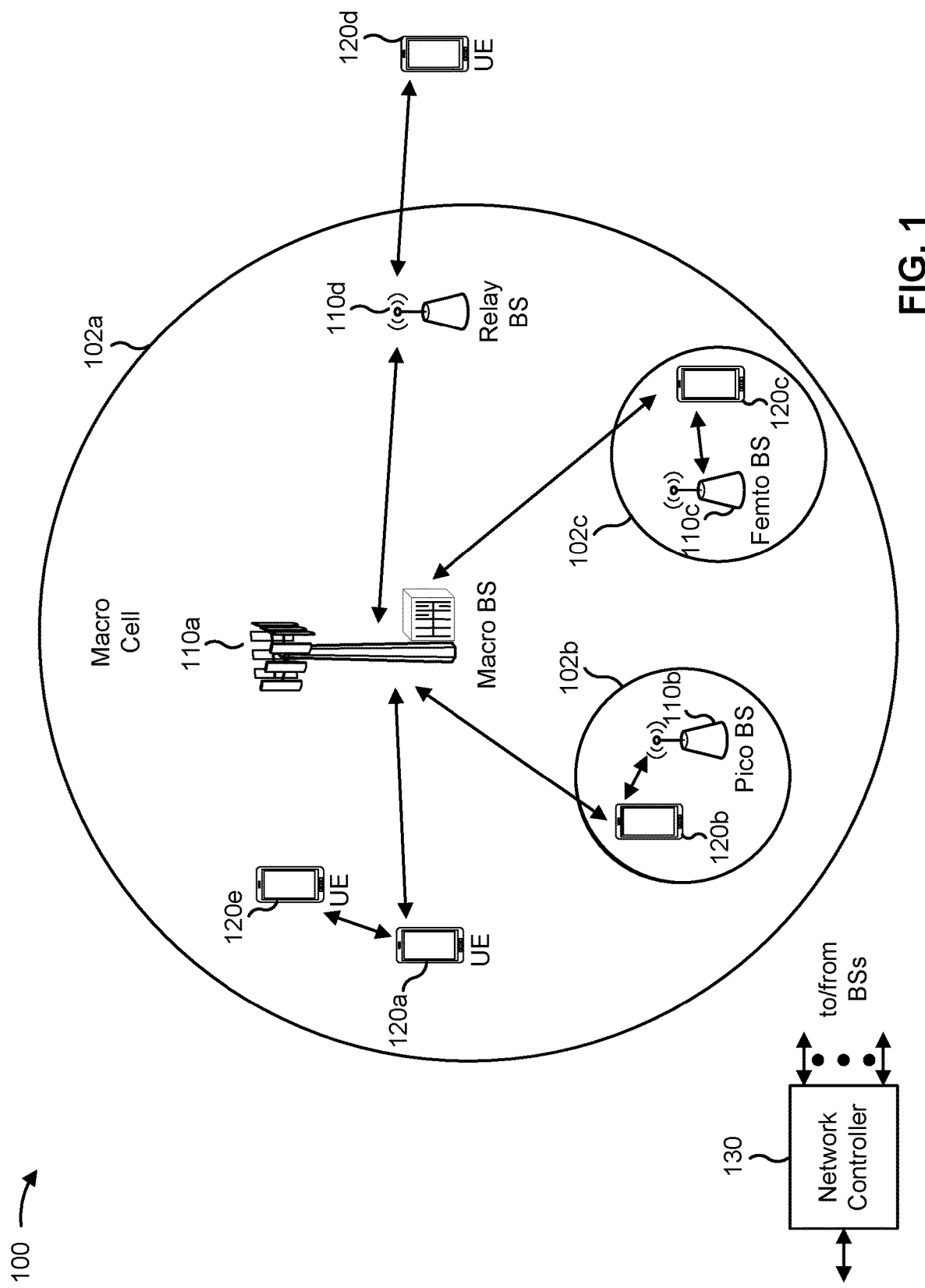
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
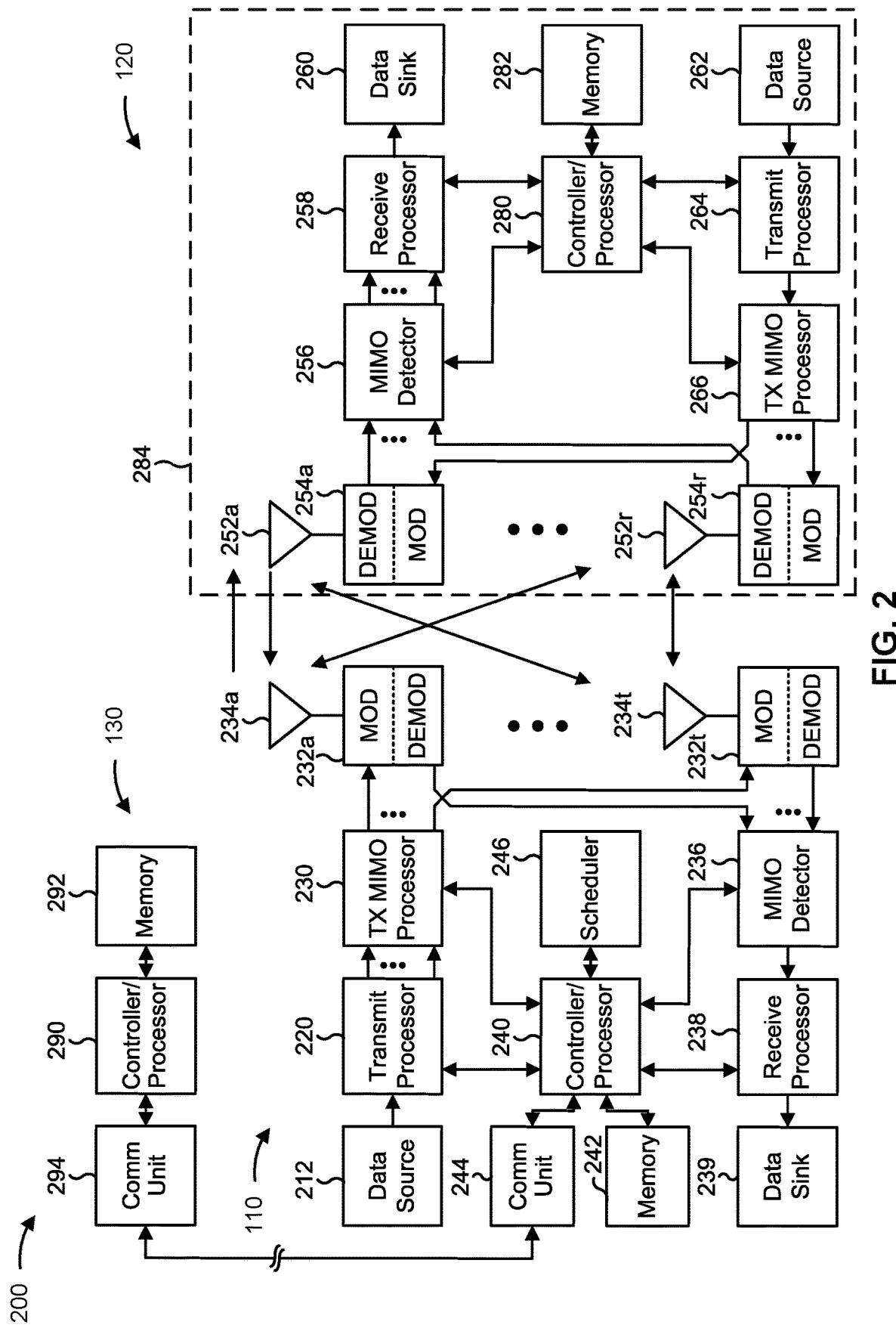
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-19).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-19).

Controller/processor 240 of base station 110, controller/processor 280 of UE 120, and/or any other component(s) of FIG. 2 may perform one or more techniques associated with using a short cadence value for discontinuous reception (DRX), as described in more detail elsewhere herein. For example, controller/processor 240 of the base station 110, controller/processor 280 of the UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. Memories 242 and 282 may store data and program codes for the base station 110 and the UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

In some aspects, the UE 120 includes means for obtaining a DRX short cadence value that corresponds to a number of Hertz (Hz), means for sleeping as part of a DRX cycle, and/or means for waking up, starting at a subframe, based at least in part on the DRX short cadence value and a subframe identifier of the subframe. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for preparing for communication with a UE according to a DRX short cadence value that corresponds to a number of Hz and/or means for transmitting, to the UE starting at a subframe, a data burst according to a DRX cycle that is based at least in part on the DRX short cadence value and a subframe identifier of the subframe. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the UE 120 includes means for obtaining a DRX short cadence value that corresponds to a number of Hz, means for sleeping as part of a DRX cycle and/or means for waking up, starting at a slot, based at least in part on the DRX short cadence value and a slot identifier of the slot. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for preparing for communication with a UE according to a DRX short cadence value that corresponds to Hz, and/or means for transmitting, to the UE starting at a slot, a data burst according to a DRX cycle that is based at least in part on the DRX short cadence value and a slot identifier of the slot. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
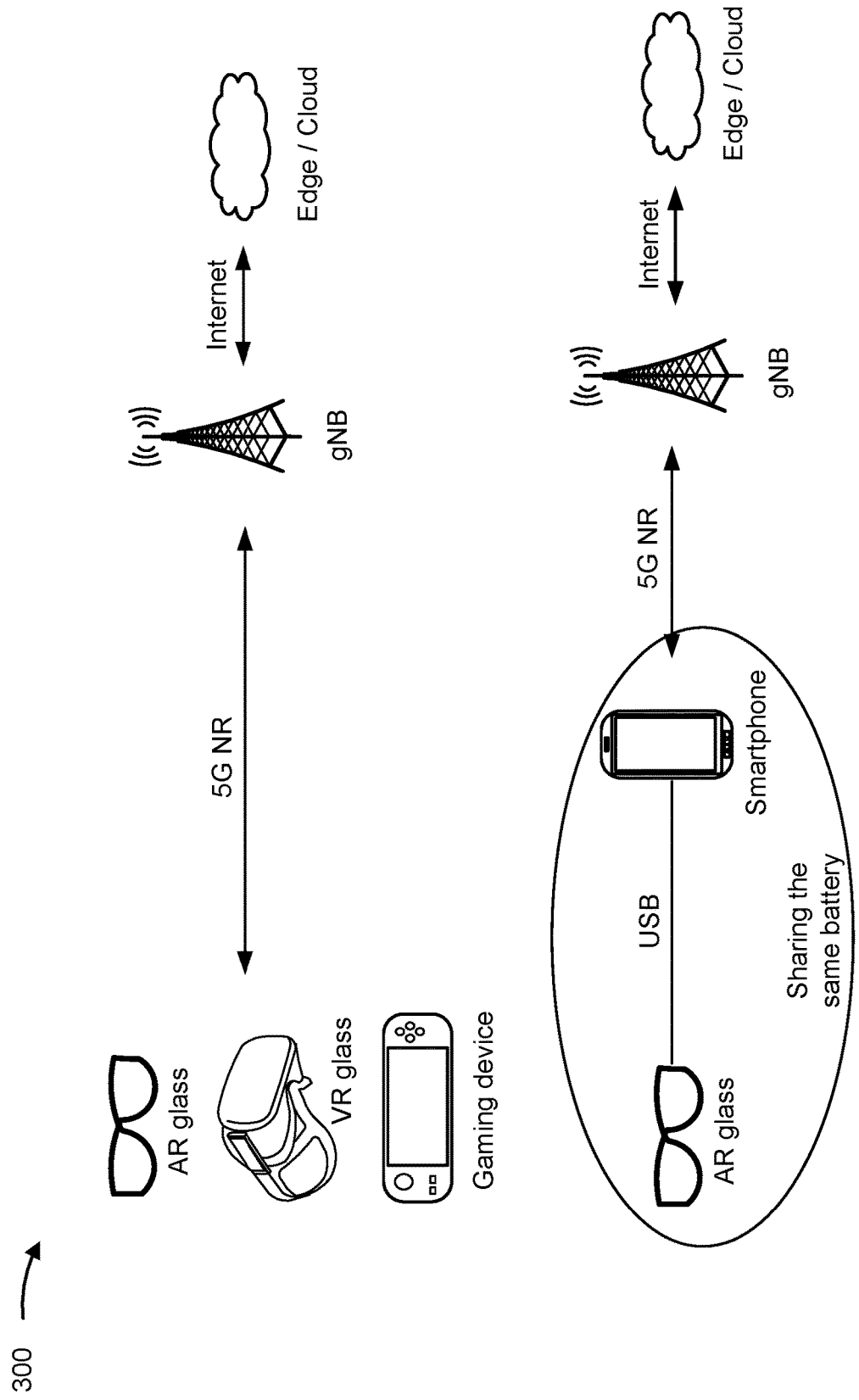
FIG. 3 is a diagram illustrating an example of devices designed for low latency applications, in accordance with the present disclosure.

FIG. 3 is a diagram illustrating an example 300 of devices designed for low latency applications, in accordance with the present disclosure.

Some devices, including devices for extended reality (XR), may require low-latency traffic to and from an edge server or a cloud environment. Example 300 shows communications between an XR device and the edge server or the cloud environment, via a base station (e.g., gNB). The XR device may be an augmented reality (AR) glass device, a virtual reality (VR) glass device, or other gaming device. XR devices may have limited battery capacity while being expected to have a battery life of a smartphone (e.g., full day of use). Battery power is an issue even when the XR device is tethered to a smartphone and uses the same smartphone battery. XR device power dissipation may be limited and may lead to an uncomfortable user experience and/or a short battery life.

As indicated above, FIG. 3 is provided as an example. Other examples may differ from what is described with regard to FIG. 3.

Figure 4:
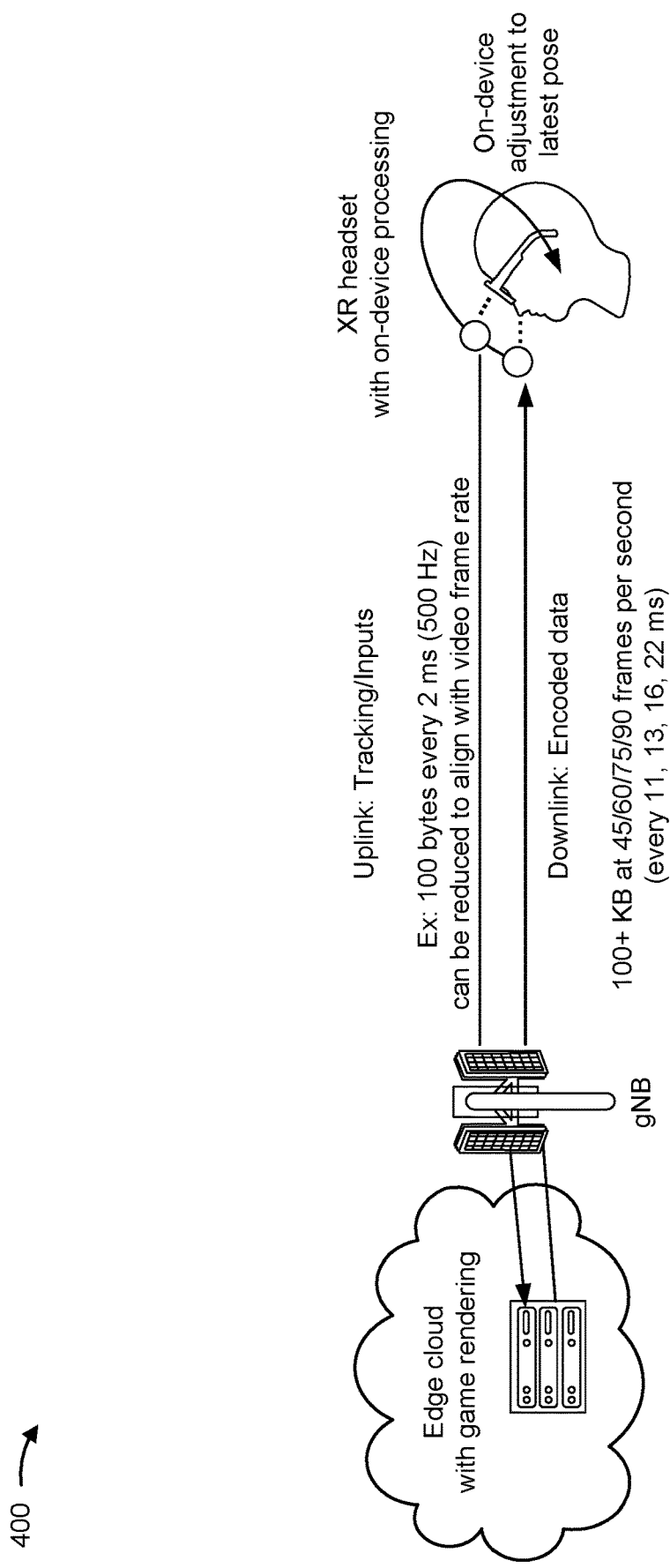
FIG. 4 is a diagram illustrating an example of low-latency traffic and power states, in accordance with the present disclosure.

FIG. 4 is a diagram illustrating an example 400 of low-latency traffic and power states, in accordance with the present disclosure.

Power dissipation may be reduced by limiting an amount of time that processing resources of the XR device are active for computations and power consumption. Some wireless communications systems may a support a UE, such as the XR device, that operates in a DRX mode. A UE in a DRX mode may transition between a sleep state for power conservation and an active state for data transmission and reception. The active state for data transmission and reception may be referred to as a DRX "ON-duration." A UE that uses different DRX cycles may have non-uniform cycle durations within a DRX time period. Such non-uniform cycle durations may provide DRX ON-durations that are aligned with a periodicity of downlink traffic to the UE. In some cases, the DRX time period may correspond to an anchor cycle that spans a set of DRX cycles, and a subset of the set of DRX cycles may have a different cycle duration than other DRX cycles of the set of DRX cycles. In some cases, an ON-duration offset value may be indicated for one or more DRX cycles within the DRX time period (e.g., via downlink control information (DCI) or a medium access control control element (MAC-CE)).

By offloading some computations to an edge server, an XR device may save processing resources. Example 400 shows a scenario where an XR device may split computations for an application with the edge server on the other side of a base station. The edge server may render video frames, such as intra-coded (I) frames and predicted (P) frames, encode the video frames, align the video frames with user pose information, and perform other related computations. However, this means there may be more traffic between the XR device and the edge server, which will cause the XR device to consume more power and signaling resources. XR downlink traffic (e.g., video frames) may have a periodic pattern that corresponds to a frame rate of transmitted video data (e.g., H.264/H.265 encoded video). Such downlink traffic may be quasi-periodic with a data burst every frame at one frame-per-second (1/fps), or two possibly staggered "eye-buffers" per frame at 1/(2*fps). For example, XR downlink traffic may include 100+ kilobytes (KB) of data for 45, 60, 75, or 90 frames per second (e.g., every 11 ms, 13 ms, 16 ms, or 22 ms). XR uplink traffic may include controller information for gaming, information for VR split rendering, and/or the user pose information. The XR uplink traffic may include 100 bytes every 2 ms (500 Hz). The XR device may reduce this periodicity to align the XR uplink traffic with the XR downlink traffic.

For low-latency applications, the DRX cycle and a start offset of a DRX cycle are to be time-aligned to downlink traffic arrivals. For example, the XR device may serve the user and enter a brief sleep state in a DRX cycle and do so between video frames. The XR device and the edge server may attempt to align the uplink and downlink DRX cycles as part of connected DRX (CDRX). However, there are DRX-multimedia timing mismatches that prevent such alignment and that prevent successful use of CDRX. For example, an update rate may be, for example, 120 Hz or 60 Hz, thus resulting in a downlink traffic burst arrival periodicity of 8.333 ms or 16.667 ms, respectively. However, conventional DRX configuration may have one millisecond as the finest granularity for a DRX cycle, and the start of the ON-duration may be aligned to millisecond time boundaries.

These partial millisecond differences may compound with each instance of a period to misalign the DRX cycle and the XR traffic periodicity. For example, the XR traffic period may drift to a middle of the DRX cycle. This causes an increase in latency.

As indicated above, FIG. 4 is provided as an example. Other examples may differ from what is described with regard to FIG. 4.

Figure 5:
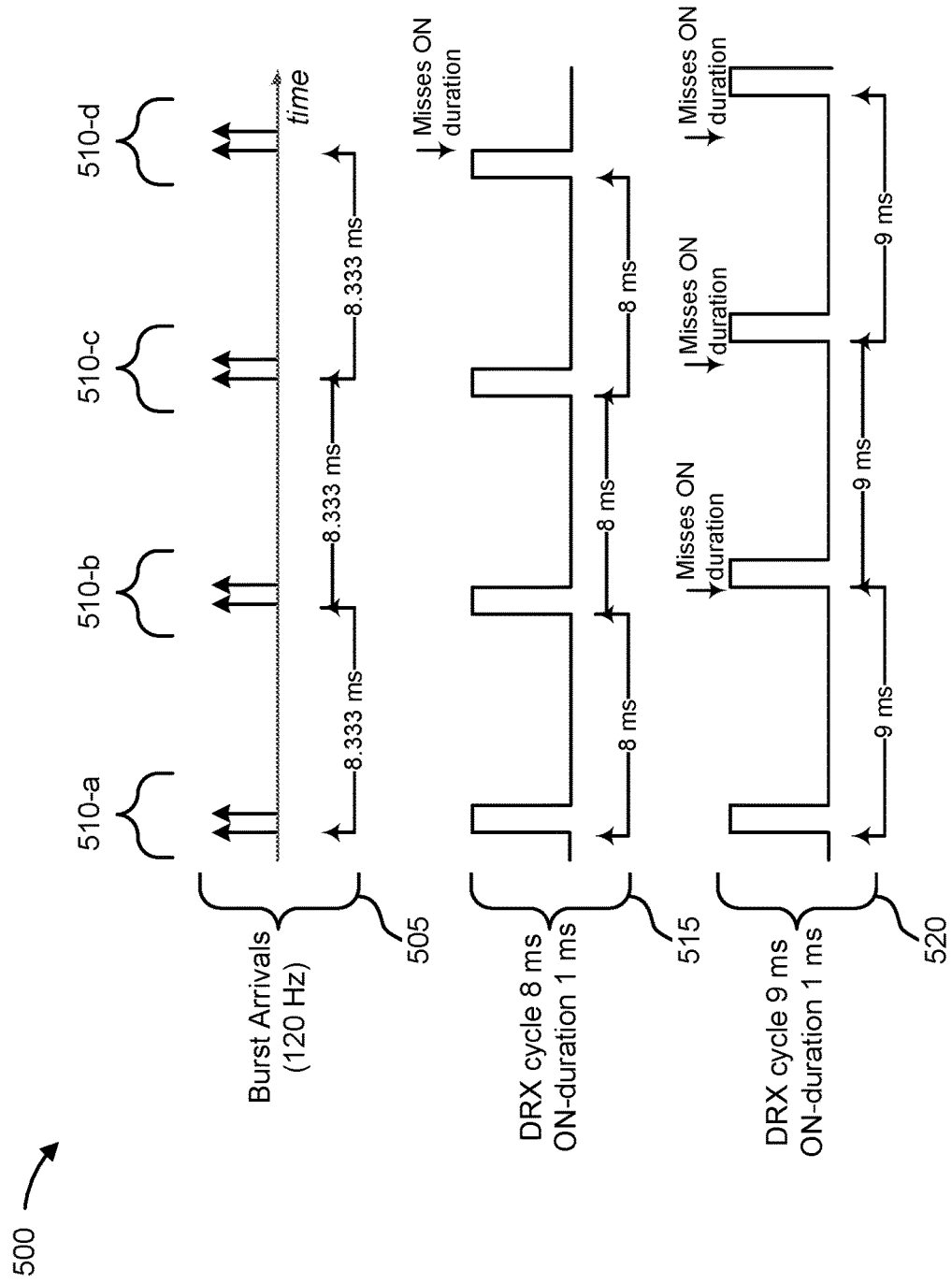
FIG. 5 illustrates an example of a misalignment of a discontinuous reception (DRX) cycle and extended reality traffic periodicity, in accordance with the present disclosure.

FIG. 5 illustrates an example 500 of a misalignment of a DRX cycle and XR traffic periodicity, in accordance with the present disclosure. Example 500 shows downlink traffic burst arrivals 505 that may include a number of downlink traffic bursts 510 that are transmitted according to a periodic pattern. Example 500 also shows a first conventional DRX configuration 515 and a second conventional DRX configuration 520.

The downlink traffic bursts 510 may include, for example, XR downlink traffic with a periodic pattern that corresponds to a frame rate of transmitted data (e.g., H.264/H.265 encoded video). An update rate may be, for example, 120 Hz or 60 Hz, thus resulting in a downlink traffic burst arrival periodicity of 8.333 ms or 16.667 ms, respectively. However, the first conventional DRX configuration 515 and the second conventional DRX configuration 520 may have one millisecond as the finest granularity for a DRX cycle, and the start of the ON-duration may be aligned to millisecond time boundaries.

In the example of FIG. 5, a 120 Hz update rate is illustrated for burst arrivals 505, thus resulting in an 8.333 ms periodicity for the downlink traffic bursts 510. In the event that the first conventional DRX configuration 515 is selected and an initial DRX cycle has an ON-duration that is aligned with the first downlink traffic burst 510-a, the second downlink traffic burst 510-b and the third downlink traffic burst 510-a will each also be within the subsequent two ON-durations. However, the fourth downlink burst 510-d would miss the fourth ON-duration, as it would occur 0.333 seconds after the end of the fourth ON-duration. If the second conventional DRX configuration 520 were to be selected instead, the result would be that the first downlink traffic burst 510-a would be aligned with an ON-duration, but subsequent downlink traffic bursts 510-b, 510-c, and 510-d would each miss the ON-duration.

Further if the DRX configuration were to be modified to have a finest granularity corresponding to a slot or symbol, such misalignments may continue to occur due to the burst arrivals 505 having a periodicity that is not a multiple of a slot or symbol duration. For example, as the traffic burst interval (120 Hz or 60 Hz) expressed in milliseconds has a factor of 3 in the denominator, which cannot divide into the numerator (i.e., 1000/120=X/3, where X is an integer such as 25 for a 120 Hz update rate or 50 for 60 Hz update rate). More generally, if DRX cycle granularity can be defined in slots, the expression would be the number of slots in a second divided by the source update rate in Hz. Misalignments between the downlink traffic bursts 510 and ON-durations may add additional latency to communications, where the additional latency is cyclic. For example, in a first missed ON-duration of an 8 ms DRX configuration, the downlink traffic burst may be retransmitted at a next ON-duration, which occurs 7 ms later than the missed ON-duration. Subsequent downlink traffic bursts will have a lower latency, which reduces by 0.333 ms each cycle, until the downlink traffic bursts are again aligned with ON-durations in 21 cycles, with such alignment lasting for three cycles. Thus, the alignment and misalignment of downlink traffic bursts in such an example would be cyclic with a period of 24 cycles, and an average latency of about 3 ms. In some cases, to reduce the latency, the DRX cycle duration may be reduced, which also has a corresponding increase in power consumption due to the extra ON-durations. As a result, the XR device may consume additional processing resources.

As indicated above, FIG. 5 is provided as an example. Other examples may differ from what is described with regard to FIG. 5.

Figure 6:
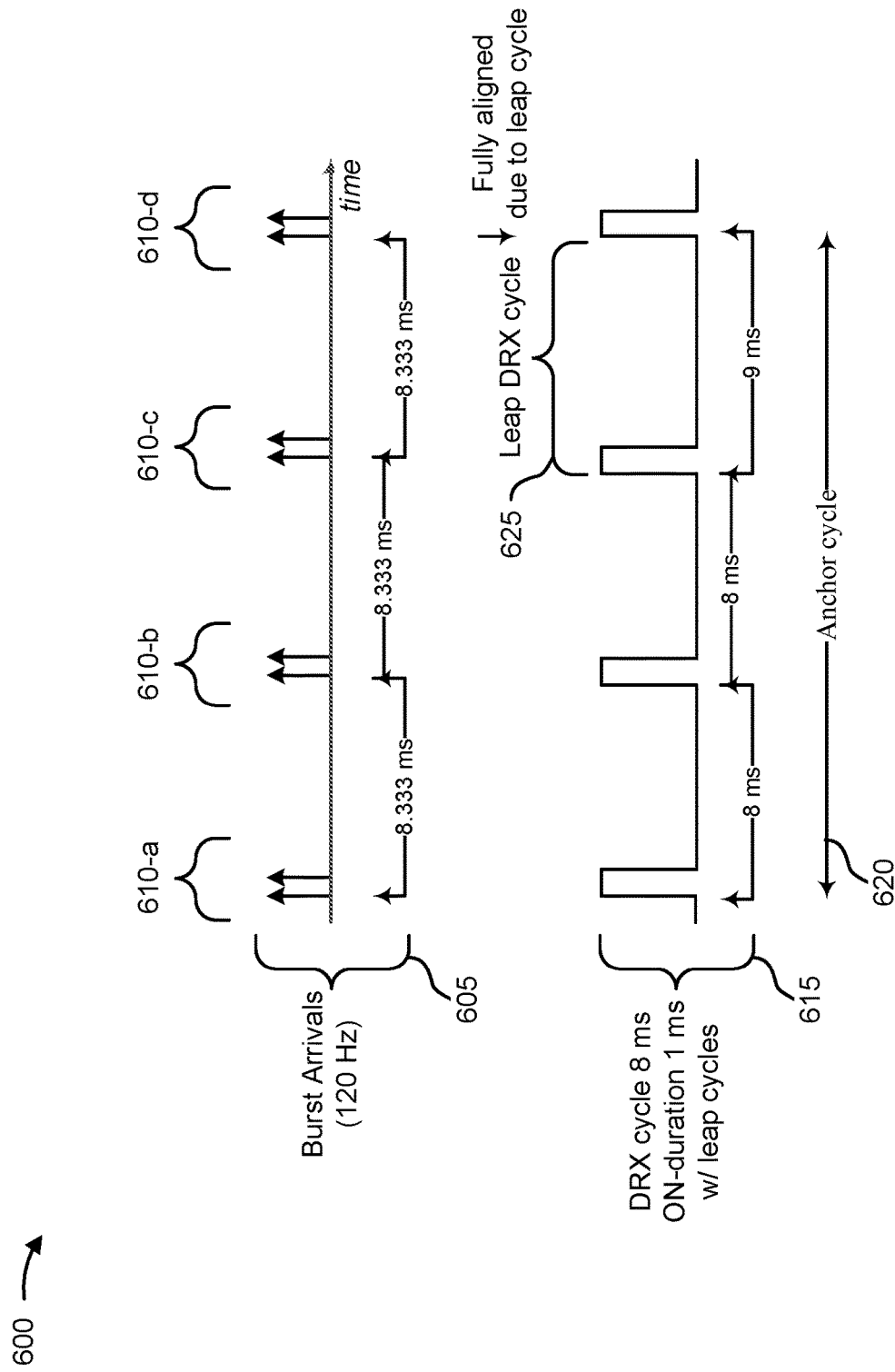
FIG. 6 illustrates an example of an anchor cycle with a leap DRX cycle, in accordance with the present disclosure.

FIG. 6 illustrates an example 600 of an anchor cycle with a leap DRX cycle, in accordance with the present disclosure.

In some scenarios, a UE (e.g., XR device) and the network may use an anchor cycle with a leap DRX cycle to better align the DRX cycle to reduce latency and conserve energy consumption. For example, the UE and the network may implement an anchor cycle with a leap DRX cycle. Downlink traffic burst arrivals 605 may include a number of downlink traffic bursts 610 that are transmitted according to a periodic pattern. The downlink traffic bursts 610 may include, for example, XR downlink traffic that has a periodic pattern with a downlink traffic bursts 610 every 8.333 ms, for example. An anchor cycle 620 may, for example, span three DRX cycles 615, and the third DRX cycle may be a leap cycle 625 that has a longer cycle duration than the initial two DRX cycles. In some cases, the anchor cycle 620, which may be an example of a DRX period, may span more or fewer DRX cycles, and may include one or more leap cycles 625. The anchor cycle 620 may be used as a basis for determining timing for radio resource management (RRM) functions. In some cases, the leap cycle 625 may include one or more additional slots than other DRX cycles of the anchor cycle 620. The position of the leap cycle(s) 625 can be varied within the anchor cycle 620. While example 600 shows burst arrivals 605 associated with periodic traffic having a 120 Hz update rate and the anchor cycle 620 includes three DRX cycles with durations of 8 ms, 8 ms, and 9 ms, other configurations may be used for different periodicities or patterns of downlink traffic. For example, for periodic traffic with a 60 Hz update rate, an anchor cycle with three DRX cycles of 16 ms, 17 ms, 17 ms may be configured, or the three DRX cycles may have durations of 16 ms, 16 ms, 18 ms, respectively. The order of the leap cycle(s) 625 among the DRX cycles within the anchor cycle 620 may also be configured. For example, for 120 Hz update rate, DRX cycles with duration of (8 ms, 8 ms, 9 ms), (8 ms, 9 ms, 8 ms), or (9 ms, 8 ms, 8 ms) can be configured. Support for such varied options in the ordering may help with offsetting multiple users in time for their respective ON-durations, in order to better distribute utilization of resources over time.

In some cases, a base station may configure a UE with a DRX configuration via radio resource control (RRC) signaling. For example, a base station may identify that periodic traffic is being transmitted to the UE (e.g., based on XR application traffic having a certain update rate, or based on historical downlink burst transmissions to the UE), and that the periodic traffic does not align with slot or subframe boundaries. The base station may determine the anchor cycle duration (e.g., based on a number of periods of the downlink traffic bursts 610 that correspond to millisecond time boundaries, such as three 8.333 ms periods that provide a 25 ms anchor cycle duration), a number of DRX cycles within the anchor cycle 620, and which of the DRX cycles are to have different cycle durations. In some cases, the RRC signaling may indicate the anchor cycle duration in milliseconds, the number of DRX cycles in the anchor cycle, and the cycle duration of each DRX cycle (e.g., 8, 8, 9). In some cases, the UE may signal to the base station that the UE has a capability to perform DRX procedures with non-uniform DRX cycles, and the base station may enable the capability when providing the DRX configuration. In other cases, non-uniform DRX cycles may be configured using other techniques, such as by adjusting a starting offset of an ON-duration of a DRX cycle, as discussed in connection with FIG. 7.

As indicated above, FIG. 6 is provided as an example. Other examples may differ from what is described with regard to FIG. 6.

Figure 7:
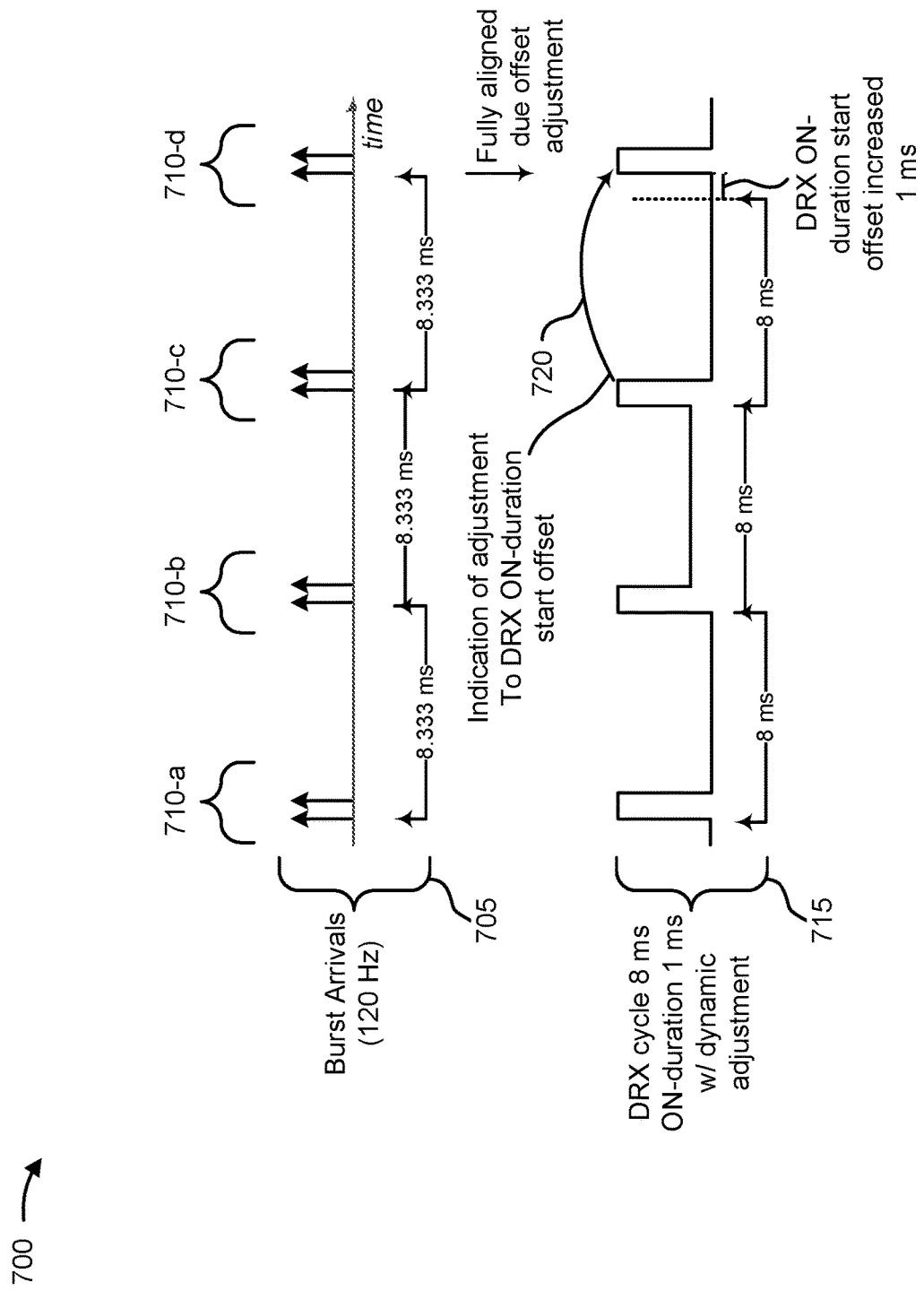
FIG. 7 illustrates an example of a DRX configuration with dynamic offset adjustment that supports DRX techniques with non-uniform cycle durations, in accordance with the present disclosure.

FIG. 7 illustrates an example 700 of a DRX configuration with dynamic offset adjustment that supports DRX techniques with non-uniform cycle durations, in accordance with the present disclosure. Example 700 shows downlink traffic burst arrivals 705 that include a number of downlink traffic bursts 710 that are transmitted according to a periodic pattern. Example 700 also shows a DRX configuration 715 with non-uniform cycle durations.

The downlink traffic bursts 710 may include, for example, XR downlink traffic that has a periodic pattern with a downlink traffic bursts 710 every 8.333 ms. In example 700, DRX configuration 715 has a configuration with an 8 ms DRX cycle duration and a 1 ms ON-duration. In the initial DRX cycles of the downlink traffic bursts 710, the ON-duration may have a zero millisecond offset, such that the first downlink traffic burst 710-*a*, the second downlink traffic burst 710-*b*, and the third downlink traffic burst 710-*c* are aligned with ON-durations. A UE may make an adjustment 720 to the DRX ON-duration start offset following the third downlink traffic burst 710-*c*, which may increase the ON-duration start offset by one millisecond in this example, such that the adjusted DRX ON-duration is aligned with the fourth downlink traffic burst 710-*d*. The UE may make another adjustment to the ON-duration offset back to the original offset following the fourth downlink traffic burst 710-*d*, and thus the DRX cycles may be configured to align ON-durations with downlink traffic bursts 710.

In some cases, the DRX ON-duration start offset adjustment can be predefined based on a specification, or defined in the DRX configuration (e.g., that is provided in RRC signaling). For example, different types of traffic (e.g., XR traffic) and different periodicities (e.g., based on a 120 Hz or 60 Hz update rate) DRX starting offsets may be defined according to a pattern such as in example 700 (e.g., every 4th DRX cycle has a 1 ms starting offset added). In some cases, the DRX starting offset may be dynamically indicated (e.g. based on MAC-CE or DCI) in a prior downlink transmission.

As indicated above, FIG. 7 is provided as an example. Other examples may differ from what is described with regard to FIG. 7.

Figure 8:
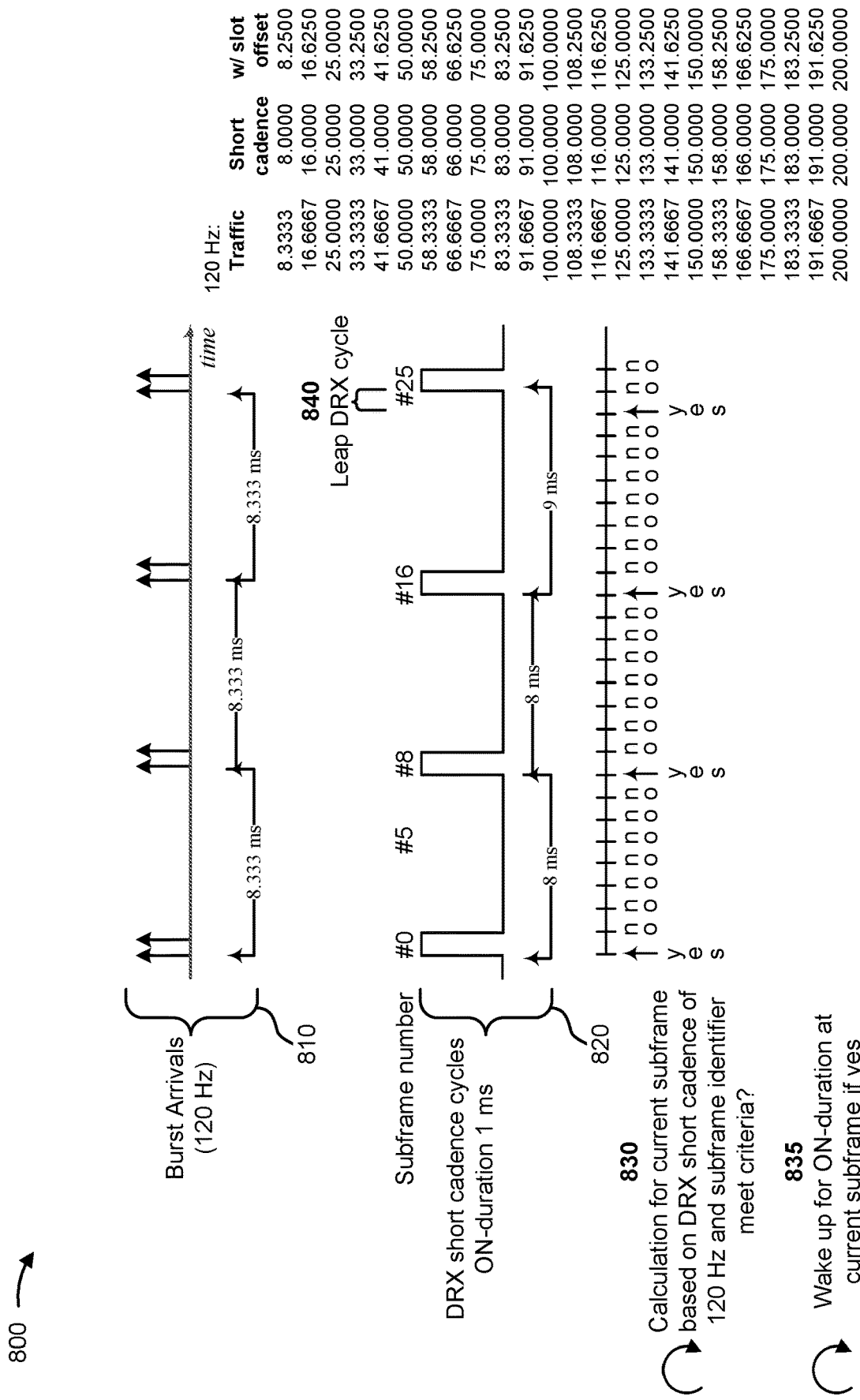
FIG. 8 is a diagram illustrating an example of using a short cadence value for DRX, in accordance with the present disclosure.

FIG. 8 is a diagram illustrating an example 800 of using a short cadence value for DRX, in accordance with the present disclosure. Example 800 shows traffic burst arrivals 810 that are arriving at a rate of 120 Hz.

The techniques described in connection with FIGS. 3-7 may improve alignment of DRX cycles and XR traffic to reduce mismatches between burst traffic and DRX ON-duration times. However, according to various aspects described herein, a UE (e.g., an XR device) and the network may further improve such alignment by using a DRX short cadence that corresponds to a number of Hz (e.g., instances per second) rather than an integer ms value. The DRX short cadence value may correspond to a number of Hz, for example, by being defined by a number of Hz or by being defined by a value that is based on or derived from a number of Hz or a similar or related unit. The DRX short cadence (drx-ShortCadence) may be, for example, 45 Hz, 60 Hz, 90 Hz, or 120 Hz, so as to align ON-duration times of the UE with traffic bursts that are received by the UE according to a video frame rate. That is, the DRX short cadence value may be a DRX timing value that corresponds to a same time unit or frequency unit by which traffic bursts are received by the UE (e.g., video frame rate). Once the base station (e.g., gNB) obtains the frame rate of traffic bursts to the UE, or the periodicity of the traffic bursts to the UE, the base station may set the DRX short cadence value. The UE may receive the DRX short cadence value from the base station or obtain the DRX short cadence value based at least in part on the frame rate or the periodicity of the traffic.

The UE may use the DRX short cadence value to determine when to wake up for an ON-duration and decode physical downlink control channel (PDCCH) grants from the base station, as part of DRX short cadence cycles 820. The UE may determine when to wake up subframe by subframe, or slot by slot. For example, as shown by reference number 830, the UE may calculate, in the first part of a current subframe (having a subframe identifier n), whether specific criteria are satisfied for the current subframe. The criteria may be associated with the DRX short cadence value and subframe identifiers and may be designed such that subframes (or slots) that satisfy the condition align with a timing of the frame rate or the periodicity of the traffic bursts received by the UE. Each subframe may be 1 ms and include multiple slots (e.g., 2, 6, 8). The criteria may be associated with a system frame number (SFN). For a subframe with subframe identifier n=[(SFN*10)+subframe number], the UE may wake up if a first ceiling value of (n*drx-ShortCadence/1000)+1 is equal to a second ceiling value of ((n+1)*(drx-ShortCadence/1000)). The ceiling operation indicates a smallest integer greater than a value if the value is not an integer, and indicates the value itself if the value is an integer. The SFN may be a number between 0 and 1023 of a frame, and the subframe number may be a number between 0 and 9 within the frame. For example, if the DRX cadence value is 120 Hz and the subframe has a subframe number of 5 in a frame with a SFN of 800, a subframe identifier n for the subframe may be (800*10)+5, or 8005. A first ceiling value may be a smallest integer greater than (8005*120/1000)+1, or 962. A second ceiling value may be a smallest integer greater than ((8005+1)*(120/1000)), or 961. The first ceiling value and the second ceiling value are not equal, and thus the UE does not satisfy the criteria and wake up for this subframe. However, a later subframe with a subframe number of 8, may render a first ceiling value of 962 (smallest integer greater than (8008*120/1000)+1) and a second ceiling value of 962 (smallest integer greater than (8008+1)*(120/1000)), and thus the UE may satisfy the criteria and wake up during that subframe. The calculation may be performed at the start of each subframe. In some aspects, multiple calculations for multiple subframes may be made at one time.

In other words, the UE may satisfy some type of criteria that is associated with the DRX short cadence (e.g., corresponding to Hz) and a subframe identifier of the subframe that uniquely identifies the subframe among consecutive subframes within a cycle or time period. The criteria, or whatever is calculated for a given subframe, may be designed to use the DRX short cadence to wake up for subframes according to a frame rate or a periodicity of the traffic bursts received by the UE.

As shown by reference number 835, the UE may wake up for an ON-duration at the current subframe. When the UE wakes up, the UE may start a DRX ON-duration timer (drx-onDurationTimer). The DRX ON-duration timer may be a minimum time duration that the UE is to be awake and may be, for example, 1 ms or 2 ms. For example, if the UE wakes up at subframe 8, and the DRX ON-duration timer is 2 ms, the UE may stay awake through subframes 8 and 9. If there is no more traffic, the UE may go back to sleep. In example 800, the DRX ON-duration timer is 1 ms. The DRX ON-duration timer may be started for a DRX group.

In some aspects, there may be a leap of 1 subframe every specified number of cycles, similar to the leap-cycle technique described in connection with FIG. 6. For example, for a cycle of 8 ms, there may be a leap of 1 subframe (1 ms) every 3 cycles to accommodate the ⅓ subframe part when the duty cycle is 8.333 ms for 120 Hz. That is, for a DRX short cadence of 120 Hz, the UE may determine to wake up for subframe n=8, 16, 25, 33, 41, 50, and so forth. As shown by reference number 840, after waking up at subframes 8 and 16, instead of subframe 24, the UE may leap 1 subframe to wake up at subframe 25. If example 800 were to continue to show ON-duration subframes, the UE may then wake up 8 ms later at subframe 33, and another 8 ms later at subframe 41. Instead of waking up 8 ms later at subframe 49, the UE may leap 1 subframe and wake up at subframe 50. In some aspects, the UE may skip calculations for one or more subframes after an ON-duration until the next possible ON-duration approaches.

In some aspects, the UE may use a DRX start offset and/or a DRX slot offset to provide for more granularity as to when to wake up within a subframe, in order to more closely align with the traffic periodicity of the UE. The UE may wake up and start a DRX ON-duration timer after a DRX start offset (drx-StartOffset) from a beginning of the subframe (n+drx-StartOffset) or a time duration associated with DRX start offset, and/or a DRX slot offset (drx-SlotOffset). The DRX start offset may be a number of ms or microseconds (μs) (or set to zero ms or μs for no DRX start offset), symbols, or mini-slots. The DRX start offset may be used to stagger multiple UEs in time. In some aspects, the UE may wake up and start the DRX ON-duration timer a time duration after the beginning of the subframe, where the time duration is associated with drx-StartOffset. That is, the UE may wait for the time duration, which starts at the beginning of the subframe, before waking up. For example, the UE may wake up at or after a time n+(drx-StartOffset mod (floor(1000/drx-ShortCadence))), where n represents the beginning of the subframe and (drx-StartOffset mod (floor(1000/drx-ShortCadence))) represents the time duration. The mod represents a modulo operation. The floor operation indicates a greatest integer less than the value of (1000/the DRX short cadence value) if the value is not an integer, and indicates the value itself if the value is an integer. The time duration may be calculated using similar values or operations that arrive at a same value for the time duration as a value of the DRX start offset mod (floor(1000/the DRX short cadence value)).

The DRX slot offset may be a number of slots. For example, if there are 8 slots in a subframe (such as for mmWave), each slot is 125 μs or 0.125 ms. If the DRX slot offset is 2 slots, the wake up time is shifted (2*0.125) or 0.250 ms. If wake up times, according to 120 Hz, were 8 ms, 16 ms, 25 ms, 33 ms, 41 ms, 50 ms, and so forth, the UE may use the DRX slot offset to better match the traffic bursts at 8.33 ms, 16.66 ms, and 25 ms by using a DRX slot offset of 2 slots at subframe 8 for 8.250 ms, a DRX slot offset of 5 slots at subframe 16 for 16.625 ms, no DRX slot offset at subframe 25 for 25.000 ms, and so forth, such as shown by the table for 120 Hz in FIG. 8. As a result, the UE may better align the DRX cycle and the traffic period to further reduce latency and conserve signaling resources.

As indicated above, FIG. 8 is provided as an example. Other examples may differ from what is described with regard to FIG. 8.

Figure 9:
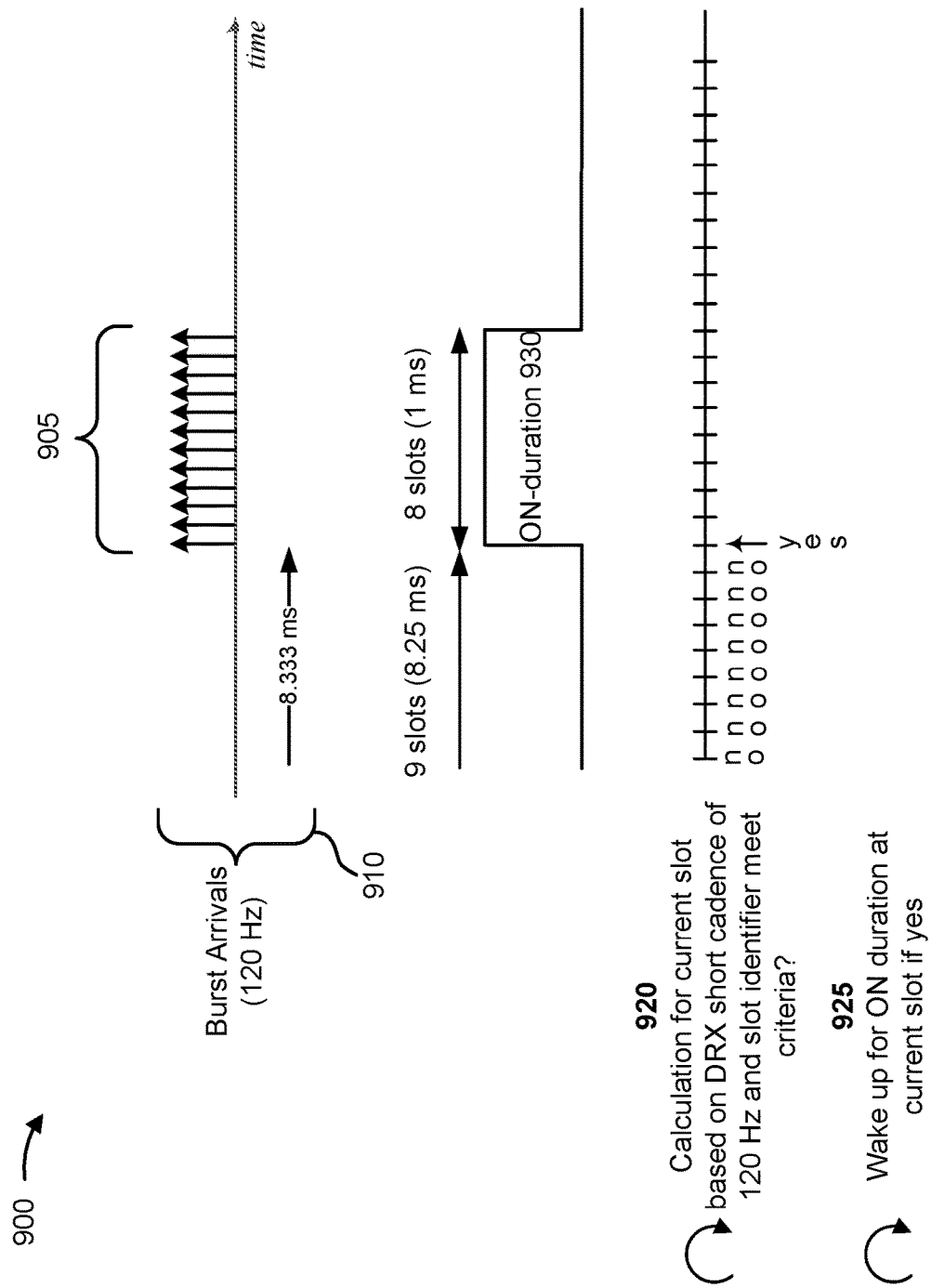
FIG. 9 is a diagram illustrating an example of using a short cadence value for DRX for slot positions, in accordance with the present disclosure.

FIG. 9 is a diagram illustrating an example 900 of using a short cadence value for DRX for slot positions, in accordance with the present disclosure. Example 900 shows a traffic burst 905 among multiple burst arrivals 910 that arrive at a rate of 120 Hz. The burst arrivals 910 in example 900 may be the same as the burst arrivals 810 shown in example 800 of FIG. 8, except that the timeline in example 900 is magnified in order to show multiple slots for a subframe.

In some aspects, the calculations per subframe that are based on a subframe identifier may be extended to slot positions, with a slot identifier k. That is, the criteria for waking up may be based at least in part on slot identifier k being equal to (((SFN*10)+subframe number)*slots per second)+a slot number. The UE may wake up and start a DRX ON-duration timer at slot k if a first ceiling value of (k*drx-ShortCadence/1000*slots per second)+1 is equal to a second ceiling value of ((k+1)*(drx-ShortCadence/1000*slots per second)). The calculations may be per slot rather than per subframe. As shown by reference number 920, the UE may determine if a calculation for a current slot, based at least in part on the DRX short cadence and the slot identifier, satisfies the criteria for waking up. As shown by reference number 925, if the UE is to wake up, the UE may wake up for the ON-duration 930, which may be a subframe or 8 slots. In some aspects, the calculation may be performed all at once at a beginning of a subframe. In other words, the UE may satisfy some criteria that is associated with the DRX short cadence value (corresponding to Hz) and a slot identifier of the slot that uniquely identifies the slot among consecutive slots within a cycle or time period. The criteria, or whatever is calculated for a given slot, may be designed to use the DRX short cadence value to wake up for slots according to a frame rate or a periodicity of the traffic bursts to the UE. In some aspects, the UE may skip calculations for one or more slots or subframes after the ON-duration.

In some aspects, the UE may wake up and start a DRX ON-duration timer after a DRX start slot offset (drx-StartSlotOffset) from a beginning of the subframe (n+drx-StartSlotOffset) or (n+(drx-StartOffset mod (floor(1000/drx-ShortCadence)))). The DRX start slot offset may be a number of ms, microseconds (μs) (or set to zero ms or μs for no DRX start slot offset), symbols, slots, or mini-slots. The DRX start slot offset may be used to stagger the UE and the other UEs in time. The DRX start slot offset may be updated based at least in part on how many UEs are transmitting, how long the UEs are staying, and if there are changes to UE behavior.

As indicated above, FIG. 9 is provided as an example. Other examples may differ from what is described with regard to FIG. 9.

Figure 10:
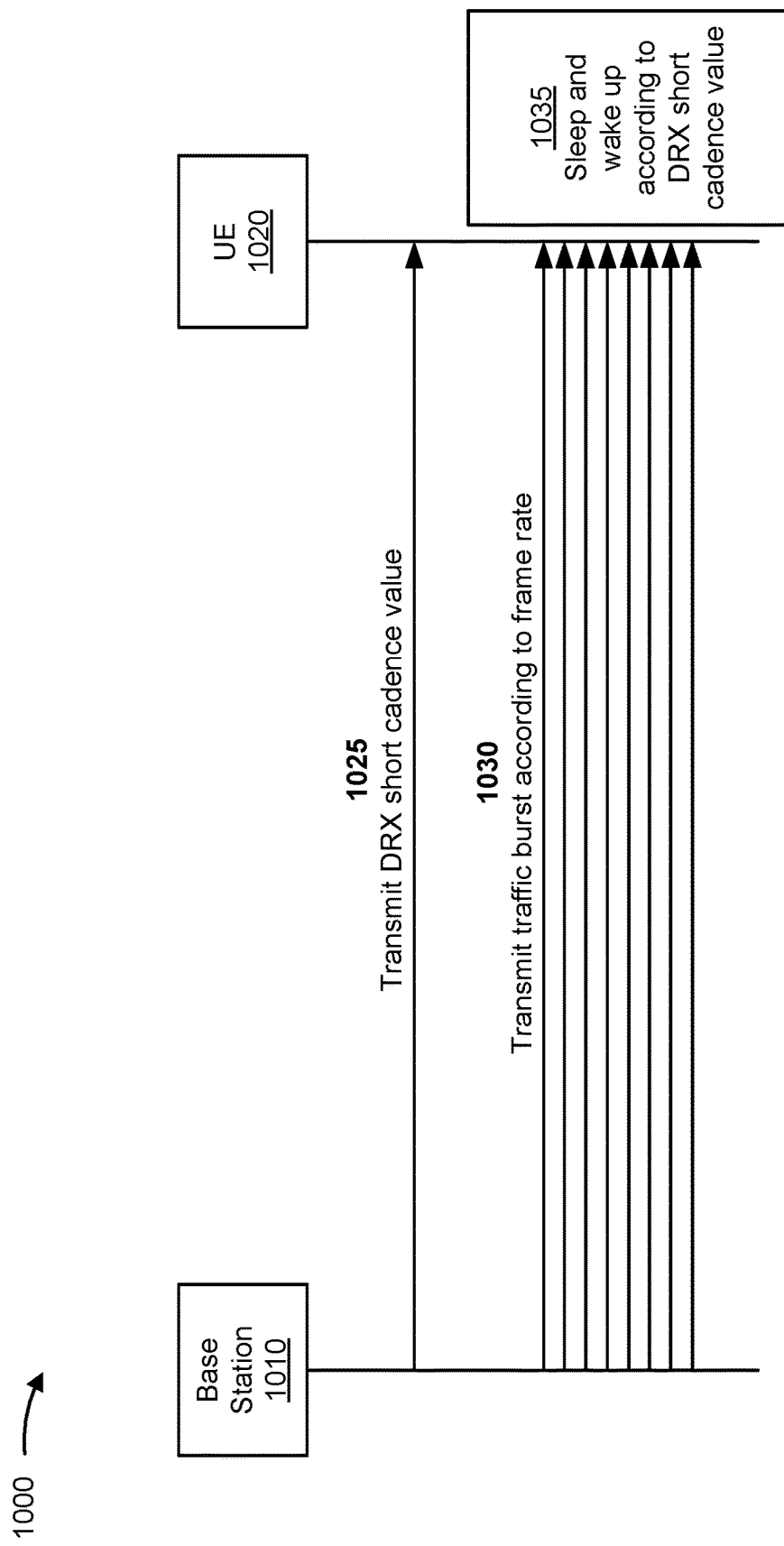
FIG. 10 is a diagram illustrating an example of using a short cadence value for DRX, in accordance with the present disclosure.

FIG. 10 is a diagram illustrating an example 1000 of using a short cadence value for DRX, in accordance with the present disclosure. As shown in FIG. 10, a base station 1010 (e.g., base station 110) may communicate with a UE 1020 (e.g., UE 120). The base station 1010 and the UE 1020 may be part of a wireless network (e.g., wireless network 100).

The UE 1020 may obtain a DRX short cadence value, which may be defined as a number of Hz. As shown by reference number 1025, the base station 1010 may transmit the DRX short cadence value to the UE 120. The UE 1020 may also obtain the DRX short cadence value from stored configuration information. For example, the UE 1020 may select a DRX short cadence value from among multiple DRX short cadence values based at least in part on a determined periodicity of traffic bursts (e.g., video frame rate) transmitted by the base station 1010, as shown by reference number 1030.

As shown by reference number 1035, the UE 1020 may sleep and wake up according to the DRX short cadence value. For example, the UE 1020 may calculate, for each subframe, whether a subframe identifier causes the UE 1020 meet the criteria for waking up, based at least in part on the DRX short cadence value. The DRX short cadence value (drx-ShortCadence) may be, for example, 120 Hz, and subframe identifier n=[(SFN*10)+subframe number]. If the subframe identifier n=7, ceil(n*drx-ShortCadence/1000)+1=2 and ceil((n+1)*drx-ShortCadence/1000)=1. As 2 does not equal 1, the criteria are not satisfied (condition is false). If the subframe identifier n=8, ceil(n*drx-ShortCadence/1000)+1=2 and ceil((n+1)*drx-ShortCadence/1000)=2. As 2 equals 2, the criteria are satisfied (condition is true). If the subframe identifier n=9, ceil(n*drx-ShortCadence/1000)+1=3 and ceil((n+1)*drx-ShortCadence/1000)=2. As 3 does not equal 2, the criteria are not satisfied (condition is false). In some aspects, the UE 1020 may use a leap cycle, a slot offset, a timing offset, or any other technique described herein to better match the periodicity of the traffic bursts. The UE 1020 may start an ON-duration timer as part of waking up.

In some aspects, the UE 1020 may perform the calculation for each slot, to determine whether a slot identifier causes the UE 1020 meet the criteria for waking up, based at least in part on the DRX short cadence value. The DRX short cadence value (drx-ShortCadence) may be, for example, 120 Hz, and slot identifier k=[((SFN*10+subframe number)*slots per second)+slot number]. The slots per second (slotPerSec) for 120 Hz may be 8. If the slot identifier k=8*8+1, ceil(k*drx-ShortCadence/(1000*slotPerSec))+1=2 and ceil((k+1)*drx-ShortCadence/(1000*slotPerSec))=1. As 2 does not equal 1, the criteria are not satisfied (condition is false). If the slot identifier k=8*8+2, ceil(k*drx-ShortCadence/(1000*slotPerSec))+1=2 and ceil((k+1)*drx-ShortCadence/(1000*slotPerSec))=2. As 2 equals 2, the criteria are satisfied (condition is true). If the slot identifier k=8*8+3, ceil(k*drx-ShortCadence/(1000*slotPerSec))+1=3 and ceil((k+1)*drx-ShortCadence/(1000*slotPerSec))=2. As 3 does not equal 2, the criteria are not satisfied (condition is false). In some aspects, slot identifier k=[((SFN*10+subframe number)*slots per subframe)+slot number]. The slots per subframe (slotsPerSubframe) for 120 Hz may be 8. If the slot identifier k=8*8+1, the criteria may be satisfied if ceil(k*drx-ShortCadence/(1000*slotsPerSubframe))+1=ceil((k+1)*drx-ShortCadence/(1000*slotsPerSubframe)). In some aspects, the UE 1020 may use a leap cycle, a slot offset, a timing offset, or any other technique described herein to better match the periodicity of the traffic bursts.

As indicated above, FIG. 10 is provided as an example. Other examples may differ from what is described with regard to FIG. 10

FIG. 11 is a diagram illustrating an example 1100 of using different short cadence values, in accordance with the present disclosure. FIG. 11 shows tables for different DRX short cadence values, including for 48 Hz, 60 Hz, 80 Hz, and 90 Hz to match corresponding frame rates of 48 Hz, 60 Hz, 80 Hz, and 90 Hz. Similar to the table for 120 Hz in FIG. 8, the first column in each table indicates the periodicity of traffic bursts (ms between traffic bursts—corresponding to a frame rate/short cadence value). The second column in each table indicates the wake up time (in ms) when the criteria is satisfied for the short cadence value, so as to match the periodicity in the first column. The third column indicates (in ms) the wake up time when using a slot offset (e.g., increments of 0.125 ms) in order to more closely match the periodicity indicated in the first column.

In other words, the UE may calculate, based at least in part on a subframe identifier for a subframe (or a slot identifier for a slot) and a DRX short cadence value of 48 Hz, 60 Hz, 80 Hz, 90 Hz, or 120 Hz, whether the subframe (or the slot) satisfies a criteria for waking up. The criteria may be designed such that the UE wakes up starting at a subframe and/or a slot that is a closest match or alignment for a traffic burst according to the periodicity of the traffic bursts. The UE may use a slot offset to closely match the periodicity. In this way, the UE more closely matches wake up times with traffic bursts so as to conserve power and processing resources while not missing any traffic bursts during an ON-duration time. The UE may adjust the ON-duration time as necessary in coordination with the short cadence value and/or the slot offset value. Note that other DRX short cadence values may be used to match frame rates of 45 Hz, 75 Hz, or other frame rates used for applications or services that are not explicitly listed herein.

As indicated above, FIG. 11 is provided as an example. Other examples may differ from what is described with regard to FIG. 11.

Figure 12:
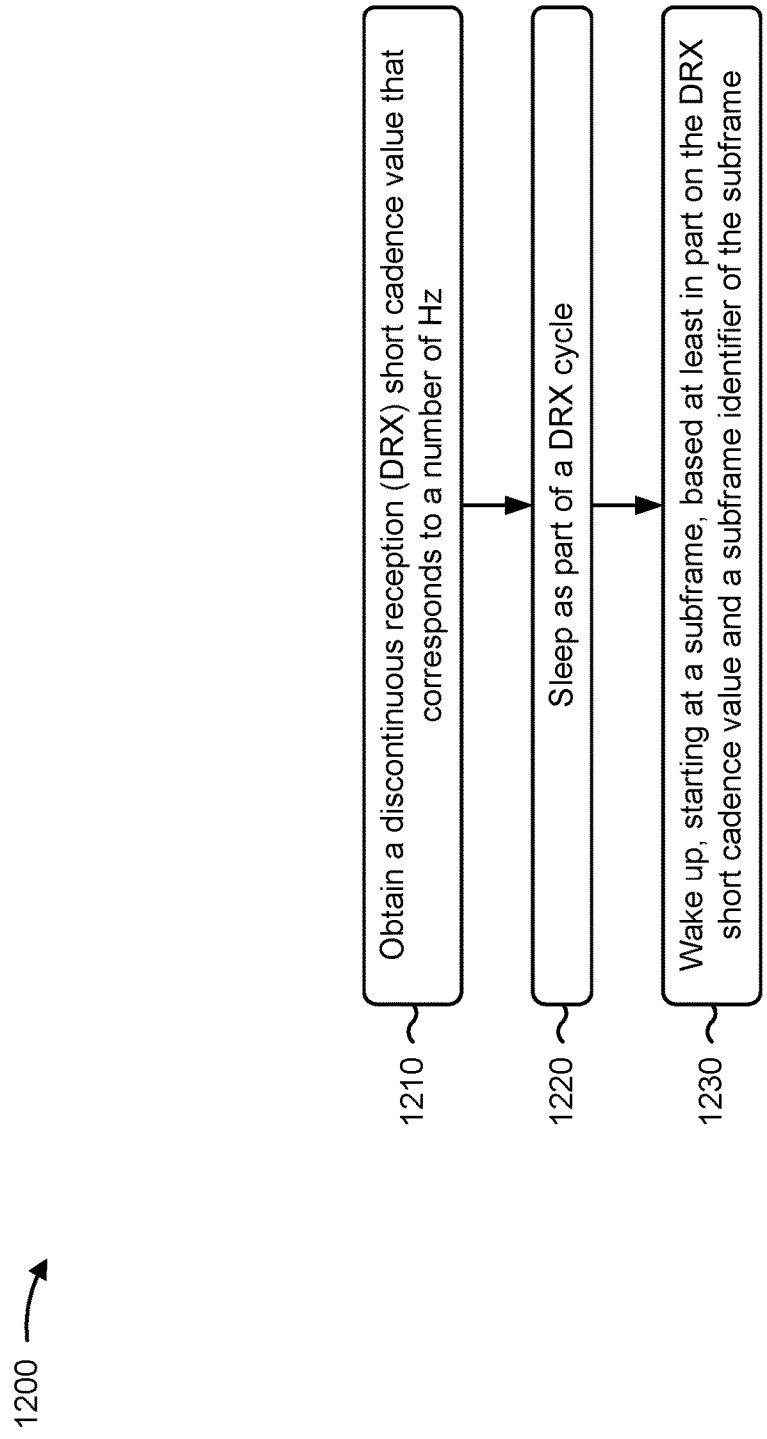
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120, UE 1020) performs operations associated with using a short cadence value for DRX.

As shown in FIG. 12, in some aspects, process 1200 may include obtaining a DRX short cadence value that corresponds to a number of Hz (block 1210). For example, the UE (e.g., using timing component 1608 depicted in FIG. 16) may obtain a DRX short cadence value that corresponds to a number of Hz, as described above.

As further shown in FIG. 12, in some aspects, process 1200 may include sleeping as part of a DRX cycle (block 1220). For example, the UE (e.g., using timing component 1608 depicted in FIG. 16) may sleep as part of a DRX cycle, as described above.

As further shown in FIG. 12, in some aspects, process 1200 may include waking up, starting at a subframe, based at least in part on the DRX short cadence value and a subframe identifier n of the subframe (block 1230). For example, the UE (e.g., using timing component 1608 depicted in FIG. 16) may wake up, starting at a subframe, based at least in part on the DRX short cadence value and a subframe identifier n of the subframe, as described above.

Process 1200 may include additional aspects, such as any single aspect or any combination of aspects described below and/or in connection with one or more other processes described elsewhere herein.

In a first aspect, the subframe identifier n is equal to (10*an SFN of a frame comprising the subframe)+a subframe number of the subframe within the frame.

In a second aspect, alone or in combination with the first aspect, the waking up includes waking up if a first ceiling value of (n*the DRX short cadence value/1000)+1 is equal to a second ceiling value of (n+1)*(the DRX short cadence value/1000). In some aspects, alone or in combination with other aspects, the waking up includes waking up a time duration after a beginning of the subframe, where the time duration includes a DRX start offset mod (floor(1000/the DRX short cadence value)).

In a third aspect, alone or in combination with one or more of the first and second aspects, the waking up includes starting an ON-duration timer.

In a fourth aspect, alone or in combination with one or more of the first through third aspects, the waking up includes waking up after a DRX slot offset from a beginning of the subframe.

In a fifth aspect, alone or in combination with one or more of the first through fourth aspects, the waking up includes waking up after a DRX start offset from a beginning of the subframe.

In a sixth aspect, alone or in combination with one or more of the first through fifth aspects, the waking up includes waking up after a DRX slot offset plus a DRX start offset from a beginning of the subframe.

In a seventh aspect, alone or in combination with one or more of the first through sixth aspects, process 1200 includes leaping a subframe before waking up starting at the subframe based at least in part on a duty cycle corresponding to the DRX short cadence value.

In an eighth aspect, alone or in combination with one or more of the first through seventh aspects, the obtaining includes receiving the DRX short cadence value from a base station.

In a ninth aspect, alone or in combination with one or more of the first through eighth aspects, the DRX short cadence value is 45 Hz, 48 Hz, 60 Hz, 75 Hz, 80 Hz, 90 Hz, or 120 Hz.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
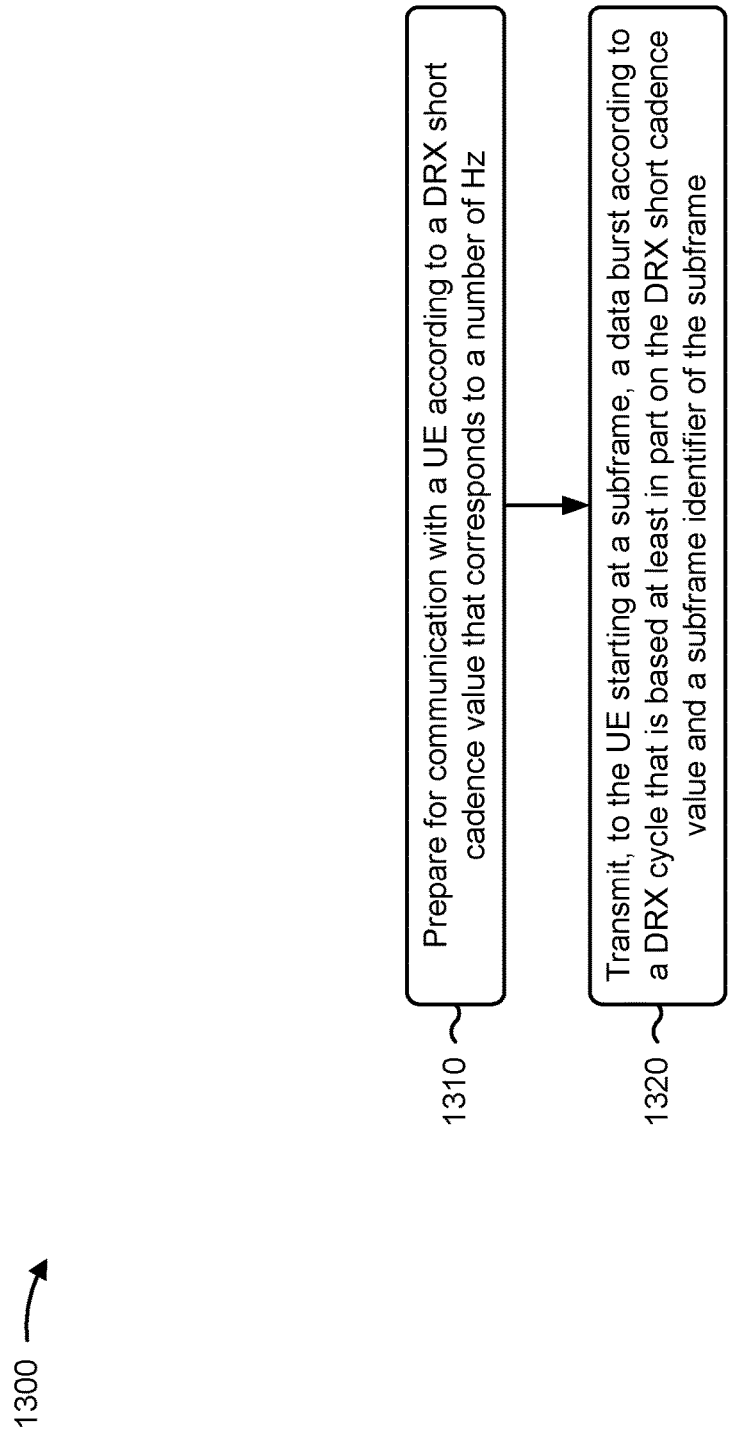
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110, base station 1010) performs operations associated with discontinuous reception short cadence.

As shown in FIG. 13, in some aspects, process 1300 may include preparing for communication with a UE according to a DRX short cadence value that corresponds to a number of Hz (block 1310). For example, the base station (e.g., using timing component 1708 depicted in FIG. 17) may prepare for communication with a UE according to a DRX short cadence value that corresponds to a number of Hz, as described above.

As further shown in FIG. 13, in some aspects, process 1300 may include transmitting, to the UE starting at a subframe, a data burst according to a DRX cycle that is based at least in part on the DRX short cadence value and a subframe identifier n of the subframe (block 1320). For example, the base station (e.g., using transmission component 1704 depicted in FIG. 17) may transmit, to the UE starting at a subframe, a data burst according to a DRX cycle that is based at least in part on the DRX short cadence value and a subframe identifier n of the subframe, as described above.

Process 1300 may include additional aspects, such as any single aspect or any combination of aspects described below and/or in connection with one or more other processes described elsewhere herein.

In a first aspect, the subframe identifier n is equal to (10*an SFN of a frame comprising the subframe)+a subframe number of the subframe within the frame.

In a second aspect, alone or in combination with the first aspect, the transmitting is performed starting at the subframe if a first ceiling value of (n*the DRX short cadence value/1000)+1 is equal to a second ceiling value of (n+1)*(the DRX short cadence value/1000). In some aspects, alone or in combination with other aspects, the transmitting is performed starting at a time duration after a beginning of the subframe, where the time duration includes a DRX start offset mod (floor(1000/the DRX short cadence value)).

In a third aspect, alone or in combination with one or more of the first and second aspects, the transmitting includes transmitting the data burst based at least in part on a DRX slot offset from a beginning of the subframe.

In a fourth aspect, alone or in combination with one or more of the first through third aspects, the transmitting includes transmitting the data burst based at least in part on a DRX start offset from a beginning of the subframe.

In a fifth aspect, alone or in combination with one or more of the first through fourth aspects, the transmitting includes transmitting the data burst based at least in part on a DRX slot offset plus a DRX start offset from a beginning of the subframe.

In a sixth aspect, alone or in combination with one or more of the first through fifth aspects, process 1300 includes leaping a subframe before transmitting the data burst in the subframe based at least in part on a duty cycle corresponding to the DRX short cadence value.

In a seventh aspect, alone or in combination with one or more of the first through sixth aspects, process 1300 includes transmitting the DRX short cadence value to the UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
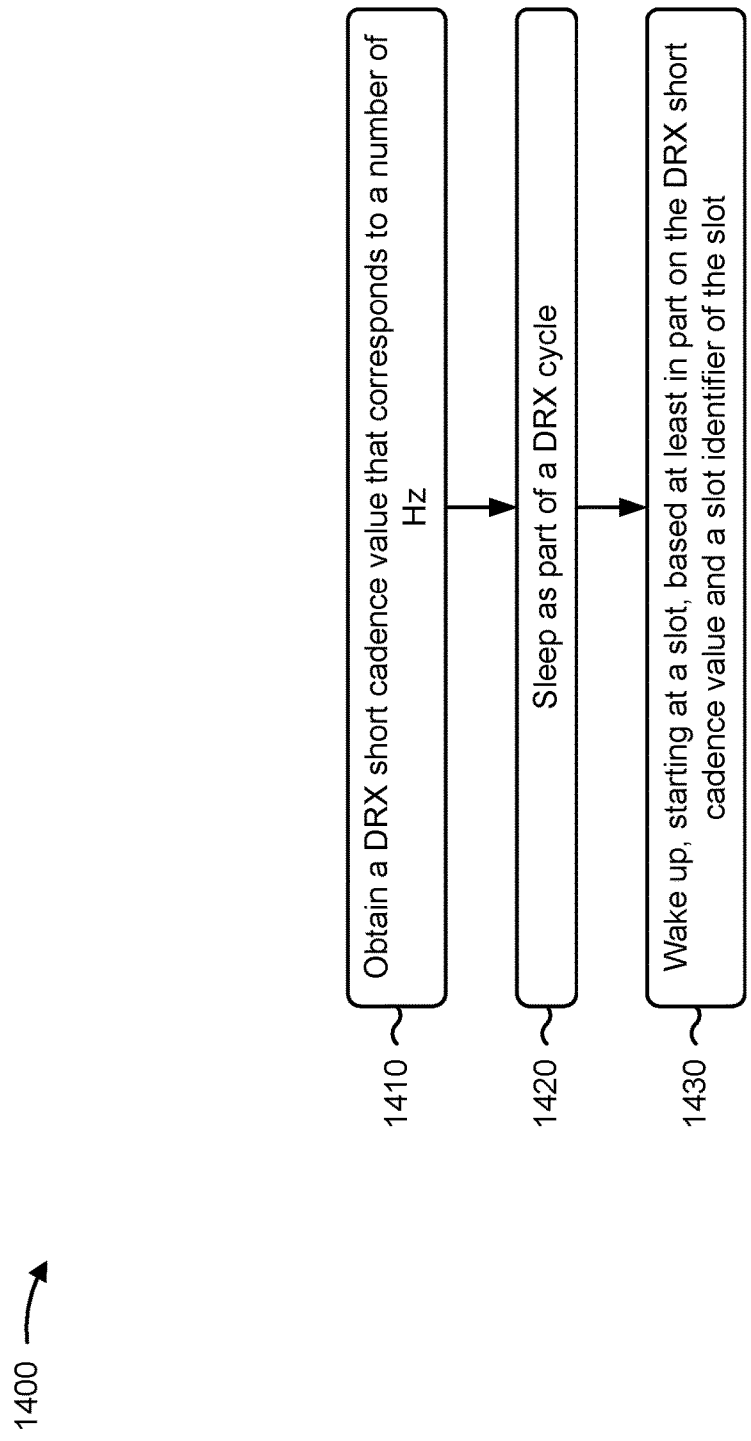
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., UE 120, UE 1020) performs operations associated with discontinuous reception short cadence.

As shown in FIG. 14, in some aspects, process 1400 may include obtaining a DRX short cadence value that corresponds to a number of Hz (block 1410). For example, the UE (e.g., using timing component 1808 depicted in FIG. 18) may obtain a DRX short cadence value that corresponds to a number of Hz, as described above.

As further shown in FIG. 14, in some aspects, process 1400 may include sleeping as part of a DRX cycle (block 1420). For example, the UE (e.g., using timing component 1808 depicted in FIG. 18) may sleep as part of a DRX cycle, as described above.

As further shown in FIG. 14, in some aspects, process 1400 may include waking up, starting at a slot, based at least in part on the DRX short cadence value and a slot identifier k of the slot (block 1430). For example, the UE (e.g., using timing component 1808 depicted in FIG. 18) may wake up, starting at a slot, based at least in part on the DRX short cadence value and a slot identifier k of the slot, as described above.

Process 1400 may include additional aspects, such as any single aspect or any combination of aspects described below and/or in connection with one or more other processes described elsewhere herein.

In a first aspect, the slot identifier k is equal to ((10*an SFN of a frame comprising a subframe comprising the slot+a subframe number of the subframe within the frame) *slots per second)+a slot number of the slot within the subframe.

In a second aspect, alone or in combination with the first aspect, the waking up includes waking up if a first ceiling value of (k*the DRX short cadence value/(1000*slots per second))+1 is equal to a second ceiling value of (k+1)*(the DRX short cadence value/(1000*slots per second)).

In a third aspect, alone or in combination with one or more of the first and second aspects, the waking up includes starting an ON-duration timer.

In a fourth aspect, alone or in combination with one or more of the first through third aspects, the waking up includes waking up after a DRX start slot offset from a beginning of the slot.

In a fifth aspect, alone or in combination with one or more of the first through fourth aspects, process 1400 includes leaping a subframe before waking up starting at the slot based at least in part on a duty cycle corresponding to the DRX short cadence value.

In a sixth aspect, alone or in combination with one or more of the first through fifth aspects, the obtaining includes receiving the DRX short cadence value from a base station.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
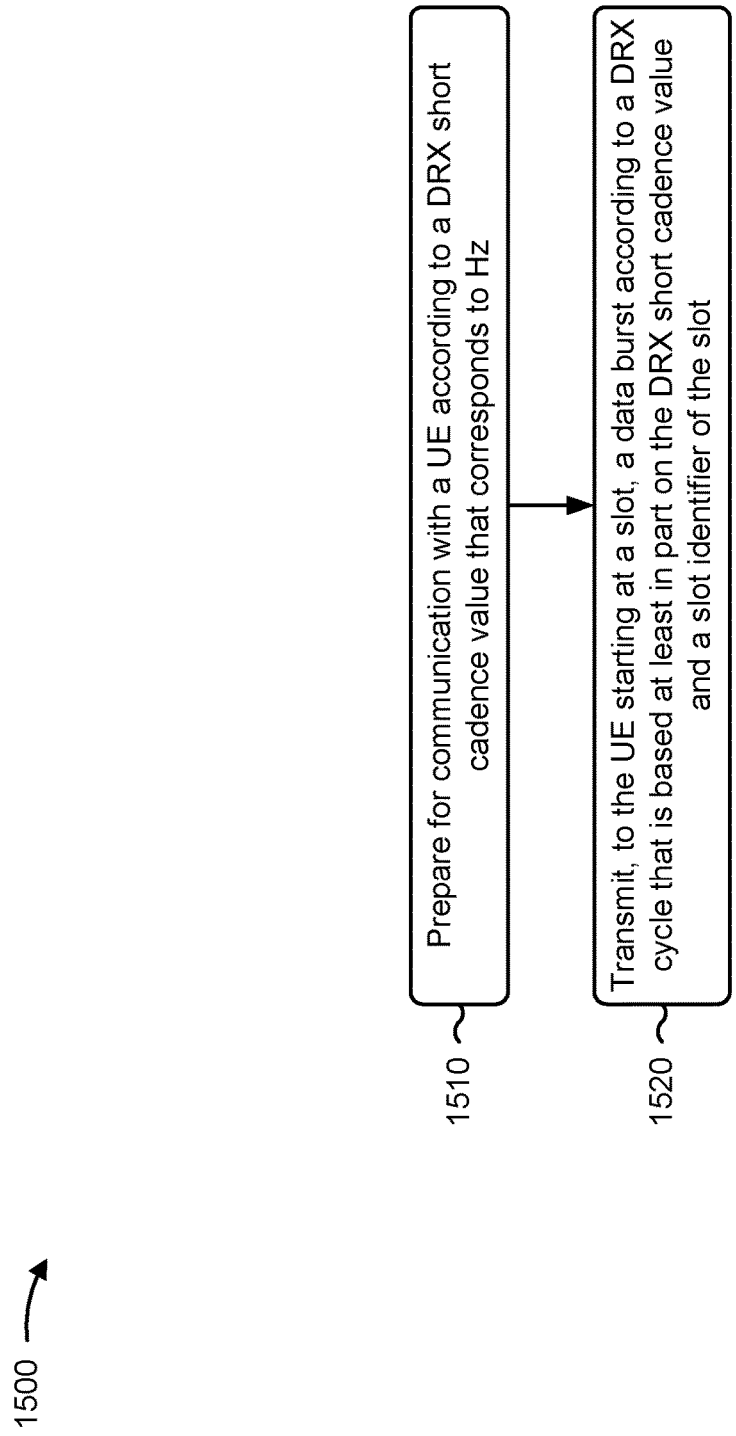
FIG. 15 is a diagram illustrating an example process performed, for example, by a base station, in accordance with the present disclosure.

FIG. 15 is a diagram illustrating an example process 1500 performed, for example, by a base station, in accordance with the present disclosure. Example process 1500 is an example where the base station (e.g., base station 110) performs operations associated with discontinuous reception short cadence.

As shown in FIG. 15, in some aspects, process 1500 may include preparing for communication with a UE according to a DRX short cadence value that corresponds to Hz (block 1510). For example, the base station (e.g., using timing component 1908 depicted in FIG. 19) may prepare for communication with a UE according to a DRX short cadence value that corresponds to Hz, as described above.

As further shown in FIG. 15, in some aspects, process 1500 may include transmitting, to the UE starting at a slot, a data burst according to a DRX cycle that is based at least in part on the DRX short cadence value and a slot identifier k of the slot (block 1520). For example, the base station (e.g., using transmission component 1904 depicted in FIG. 19) may transmit, to the UE starting at a slot, a data burst according to a DRX cycle that is based at least in part on the DRX short cadence value and a slot identifier k of the slot, as described above.

Process 1500 may include additional aspects, such as any single aspect or any combination of aspects described below and/or in connection with one or more other processes described elsewhere herein.

In a first aspect, the slot identifier k is equal to ((10*an SFN of a frame comprising a subframe comprising the slot+a subframe number of the subframe within the frame) *slots per second)+a slot number of the slot within the subframe.

In a second aspect, alone or in combination with the first aspect, the transmitting is performed starting at the slot if a first ceiling value of (k*the DRX short cadence value/ (1000*slots per second))+1 is equal to a second ceiling value of (k+1)*(the DRX short cadence value/(1000*slots per second)).

In a third aspect, alone or in combination with one or more of the first and second aspects, the transmitting includes transmitting the data burst based at least in part on a DRX start slot offset from a beginning of the slot.

In a fourth aspect, alone or in combination with one or more of the first through third aspects, process 1500 includes transmitting the DRX short cadence value to the UE.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
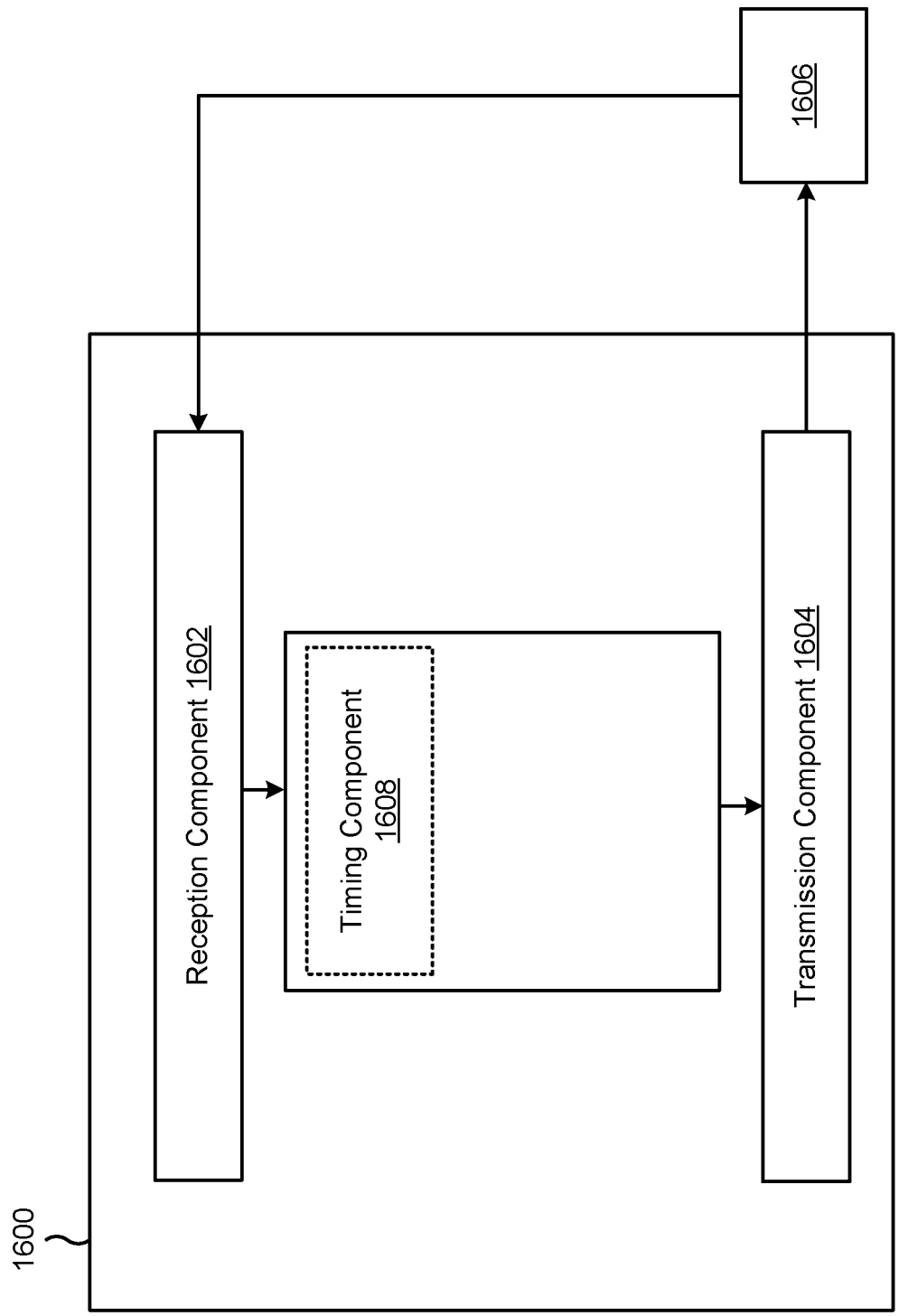
FIGS. 16-19 are block diagrams of example apparatuses for wireless communication, in accordance with the present disclosure.

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a timing component 1608, among other examples.

In some aspects, the apparatus 1600 may be configured to perform one or more operations described herein in connection with FIGS. 1-11. Additionally, or alternatively, the apparatus 1600 may be configured to perform one or more processes described herein, such as process 1200 of FIG. 12. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The timing component 1608 may obtain a DRX short cadence value that corresponds to a number of Hz. The timing component 1608 may cause the apparatus 1600 to sleep as part of a DRX cycle. The timing component 1608 may wake up the apparatus 1600, starting at a subframe, based at least in part on the DRX short cadence value and a subframe identifier of the subframe.

The timing component 1608 may leap a subframe before waking up starting at the subframe based at least in part on a duty cycle corresponding to the DRX short cadence value.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
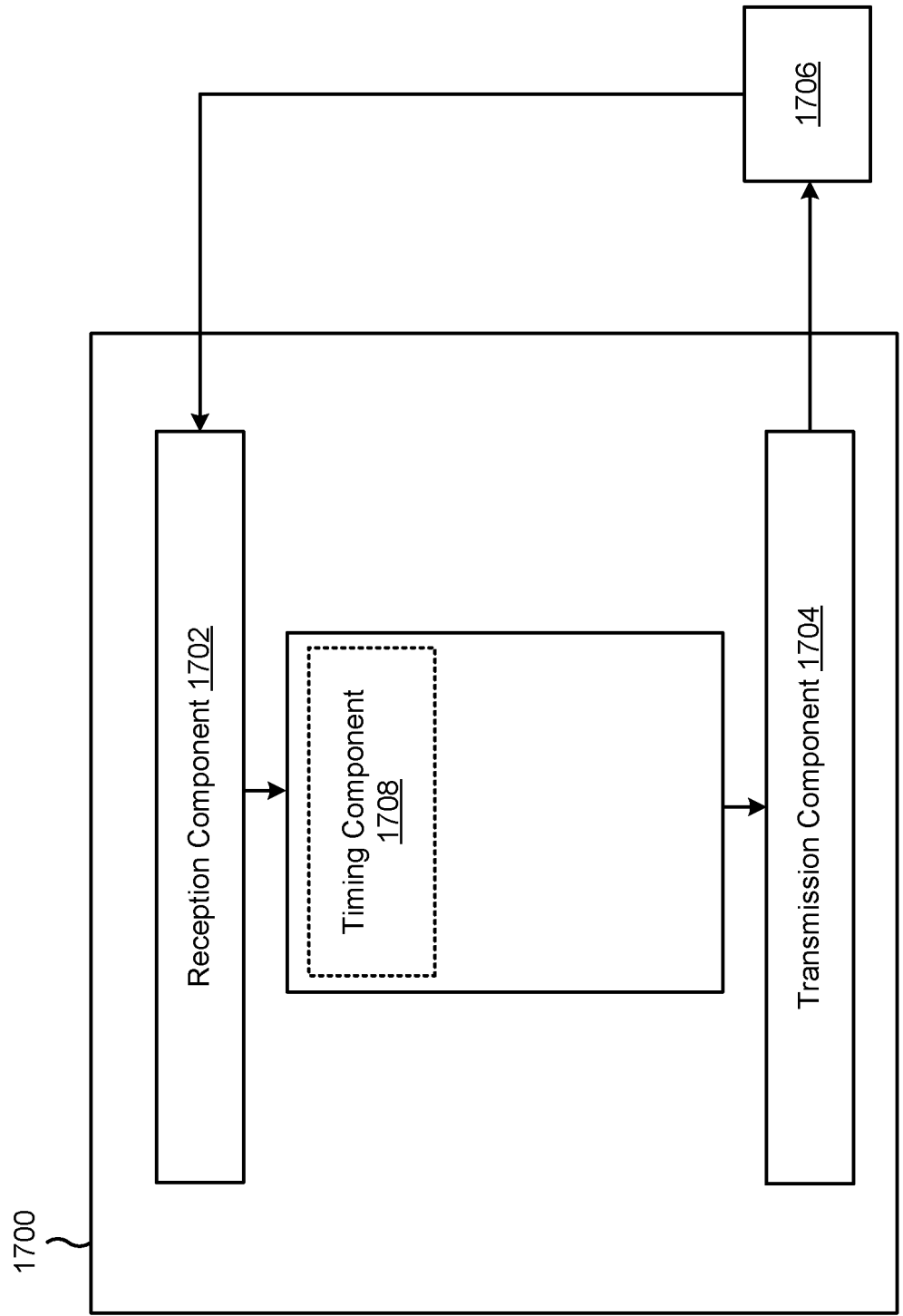

FIG. 17 is a block diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a timing component 1708, among other examples.

In some aspects, the apparatus 1700 may be configured to perform one or more operations described herein in connection with FIGS. 1-11. Additionally, or alternatively, the apparatus 1700 may be configured to perform one or more processes described herein, such as process 1300 of FIG. 13. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be co-located with the reception component 1702 in a transceiver.

The timing component 1708 may prepare for communication with a UE according to a DRX short cadence value that corresponds to a number of Hz. The transmission component 1704 may transmit, to the UE starting at a subframe, a data burst according to a DRX cycle that is based at least in part on the DRX short cadence value and a subframe identifier of the subframe. The timing component 1708 may leap a subframe before transmitting the data burst in the subframe based at least in part on a duty cycle corresponding to the DRX short cadence value.

The timing component 1708 may determine the DRX short cadence value based at least in part on a capability of the UE, information from the UE, application requirements, and/or traffic conditions. The transmission component 1704 may transmit the DRX short cadence value to the UE.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
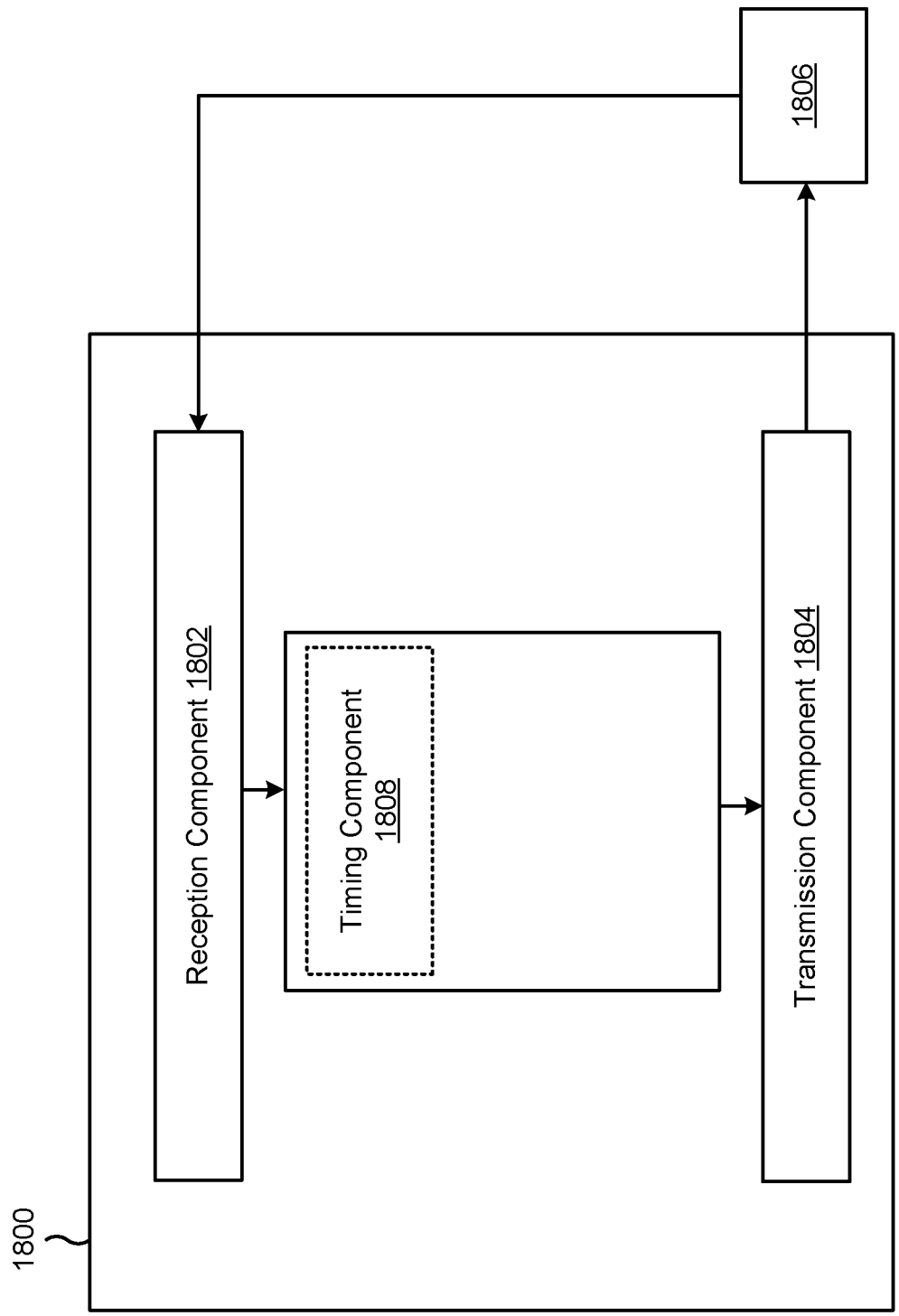

FIG. 18 is a block diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a timing component 1808, among other examples.

In some aspects, the apparatus 1800 may be configured to perform one or more operations described herein in connection with FIGS. 1-11. Additionally, or alternatively, the apparatus 1800 may be configured to perform one or more processes described herein, such as process 1400 of FIG. 14. In some aspects, the apparatus 1800 and/or one or more components shown in FIG. 18 may include one or more components of the UE described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the UE described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described above in connection with FIG. 2. In some aspects, the transmission component 1804 may be co-located with the reception component 1802 in a transceiver.

The timing component 1808 may obtain a DRX short cadence value that corresponds to a number of Hz. The timing component 1808 may cause the apparatus 1800 to sleep as part of a DRX cycle. The timing component 1808 may wake up the apparatus 1800, starting at a slot, based at least in part on the DRX short cadence value and a slot identifier of the slot. The timing component 1808 may leap a subframe before waking up starting at the slot based at least in part on a duty cycle corresponding to the DRX short cadence value.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
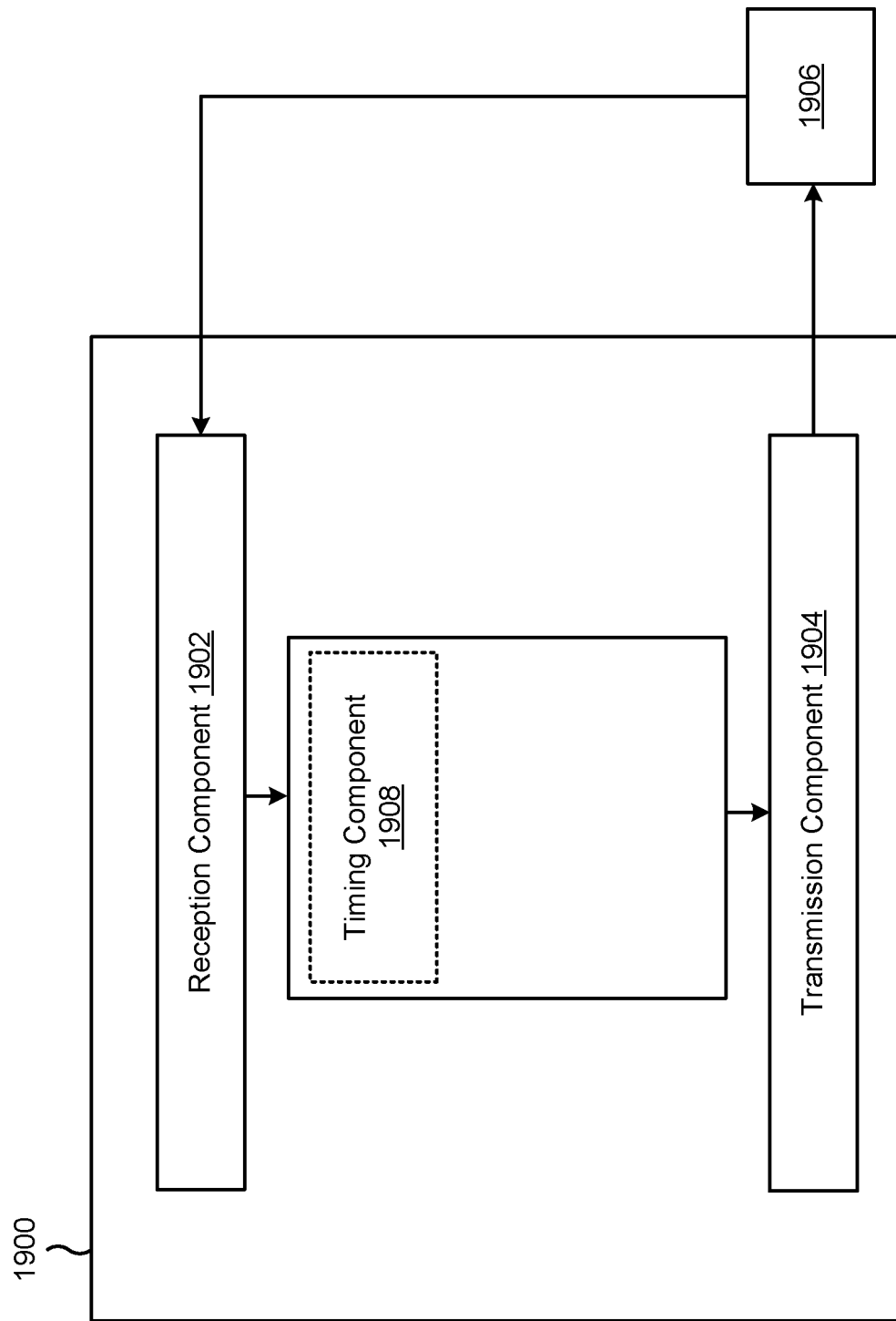

FIG. 19 is a block diagram of an example apparatus 1900 for wireless communication. The apparatus 1900 may be a base station, or a base station may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a timing component 1908, among other examples.

In some aspects, the apparatus 1900 may be configured to perform one or more operations described herein in connection with FIGS. 1-11. Additionally, or alternatively, the apparatus 1900 may be configured to perform one or more processes described herein, such as process 1500 of FIG. 15. In some aspects, the apparatus 1900 and/or one or more components shown in FIG. 19 may include one or more components of the base station described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the base station described above in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the base station described above in connection with FIG. 2. In some aspects, the transmission component 1904 may be co-located with the reception component 1902 in a transceiver.

The timing component 1908 may prepare for communication with a UE according to a DRX short cadence value that corresponds to Hz. The transmission component 1904 may transmit, to the UE starting at a slot, a data burst according to a DRX cycle that is based at least in part on the DRX short cadence value and a slot identifier of the slot.

The timing component 1908 may determine the DRX short cadence value based at least in part on a capability of the UE, information from the UE, application requirements, and/or traffic conditions. The transmission component 1904 may transmit the DRX short cadence value to the UE.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: obtaining a discontinuous reception (DRX) short cadence value that corresponds to a number of Hertz (Hz); sleeping as part of a DRX cycle; and waking up, starting at a subframe, based at least in part on the DRX short cadence value and a subframe identifier n of the subframe.

Aspect 2: The method of Aspect 1, wherein the subframe identifier n is equal to (10*a serial frame number of a frame comprising the subframe)+a subframe number of the subframe within the frame.

Aspect 3: The method of Aspect 2, wherein the waking up includes waking up if a first ceiling value of (n*the DRX short cadence value/1000)+1 is equal to a second ceiling value of (n+1)*(the DRX short cadence value/1000).

Aspect 4: The method of any of Aspects 1-3, wherein the waking up includes waking up a time duration after a beginning of the subframe, where the time duration includes a DRX start offset mod (floor(1000/the DRX short cadence value)).

Aspect 5: The method of any of Aspects 1-4, wherein the waking up includes starting an ON-duration timer.

Aspect 6: The method of any of Aspects 1-5, wherein the waking up includes waking up after a DRX slot offset from a beginning of the subframe.

Aspect 7: The method of any of Aspects 1-5, wherein the waking up includes waking up after a DRX start offset from a beginning of the subframe.

Aspect 8: The method of any of Aspects 1-5, wherein the waking up includes waking up after a DRX slot offset plus a DRX start offset from a beginning of the subframe.

Aspect 9: The method of any of Aspects 1-8, further comprising leaping a subframe before waking up starting at the subframe based at least in part on a duty cycle corresponding to the DRX short cadence value.

Aspect 10: The method of any of Aspects 1-9, wherein the obtaining includes receiving the DRX short cadence value from a base station.

Aspect 11: The method of any of Aspects 1-10, wherein the DRX short cadence value is at least one of 45 Hz, 48 Hz, 60 Hz, 75 Hz, 80 Hz, 90 Hz, or 120 Hz.

Aspect 12: A method of wireless communication performed by a base station, comprising: preparing for communication with a user equipment (UE) according to a discontinuous reception (DRX) short cadence value that corresponds to a number of Hertz (Hz); and transmitting, to the UE starting at a subframe, a data burst according to a DRX cycle that is based at least in part on the DRX short cadence value and a subframe identifier n of the subframe.

Aspect 13: The method of Aspect 12, wherein the subframe identifier n is equal to (10*a serial frame number of a frame comprising the subframe)+a subframe number of the subframe within the frame.

Aspect 14: The method of Aspect 13, wherein the transmitting is performed starting at the subframe if a first ceiling value of (n*the DRX short cadence value/1000)+1 is equal to a second ceiling value of (n+1)*(the DRX short cadence value/1000).

Aspect 15: The method of any of Aspects 12-14, wherein the transmitting includes transmitting the data burst starting a time duration after a beginning of the subframe, wherein the time duration includes a DRX start offset mod (floor(1000/the DRX short cadence value)).

Aspect 16: The method of any of Aspects 12-14, wherein the transmitting includes transmitting the data burst based at least in part on a DRX slot offset from a beginning of the subframe.

Aspect 17: The method of any of Aspects 12-14, wherein the transmitting includes transmitting the data burst based at least in part on a DRX start offset from a beginning of the subframe.

Aspect 18: The method of any of Aspects 12-14, wherein the transmitting includes transmitting the data burst based at least in part on a DRX slot offset plus a DRX start offset from a beginning of the subframe.

Aspect 19: The method of any of Aspects 12-18, further comprising leaping a subframe before transmitting the data burst in the subframe based at least in part on a duty cycle corresponding to the DRX short cadence value.

Aspect 20: The method of any of Aspects 12-19, further comprising transmitting the DRX short cadence value to the UE.

Aspect 21: A method of wireless communication performed by a user equipment (UE), comprising: obtaining a discontinuous reception (DRX) short cadence value that corresponds to a number of Hertz (Hz); sleeping as part of a DRX cycle; and waking up, starting at a slot, based at least in part on the DRX short cadence value and a slot identifier k of the slot.

Aspect 22: The method of Aspect 21, wherein the slot identifier k is equal to ((10*a serial frame number of a frame comprising a subframe comprising the slot+a subframe number of the subframe within the frame)*slots per second)+a slot number of the slot within the subframe.

Aspect 23: The method of Aspect 22, wherein the waking up includes waking up if a first ceiling value of (k*the DRX short cadence value/(1000*slots per second))+1 is equal to a second ceiling value of (k+1)*(the DRX short cadence value/(1000*slots per second)).

Aspect 24: The method of any of Aspects 21-23, wherein the waking up includes waking up a time duration after a beginning of the subframe, where the time duration includes a DRX start offset mod (floor(1000/the DRX short cadence value)).

Aspect 25: The method of any of Aspects 21-24, wherein the waking up includes starting an ON-duration timer.

Aspect 26: The method of any of Aspects 21-25, wherein the waking up includes waking up after a DRX start slot offset from a beginning of the slot.

Aspect 27: The method of any of Aspects 21-26, further comprising leaping a subframe before waking up starting at the slot based at least in part on a duty cycle corresponding to the DRX short cadence value.

Aspect 28: The method of any of Aspects 21-27, wherein the obtaining includes receiving the DRX short cadence value from a base station.

Aspect 29: A method of wireless communication performed by a base station, comprising: preparing for communication with a user equipment (UE) according to a discontinuous reception (DRX) short cadence value that corresponds to Hertz (Hz); and transmitting, to the UE starting at a slot, a data burst according to a DRX cycle that is based at least in part on the DRX short cadence value and a slot identifier k of the slot.

Aspect 30: The method of Aspect 29, wherein the slot identifier k is equal to ((10*a serial frame number of a frame comprising a subframe comprising the slot+a subframe number of the subframe within the frame)*slots per second)+a slot number of the slot within the subframe.

Aspect 31: The method of Aspect 30, wherein the transmitting is performed starting at the slot if a first ceiling value of (k*the DRX short cadence value/(1000*slots per second))+1 is equal to a second ceiling value of (k+1)*(the DRX short cadence value/(1000*slots per second)).

Aspect 32: The method of any of Aspects 29-31, wherein the transmitting includes transmitting the data burst starting a time duration after a beginning of the subframe, wherein the time duration includes a DRX start offset mod (floor (1000/the DRX short cadence value)).

Aspect 33: The method of any of Aspects 29-32, wherein the transmitting includes transmitting the data burst based at least in part on a DRX start slot offset from a beginning of the slot.

Aspect 34: The method of any of Aspects 29-33, further comprising transmitting the DRX short cadence value to the UE.

Aspect 35: An apparatus for wireless communication at a device, comprising a processor; memory coupled with the processor; and instructions stored in the memory and executable by the processor to cause the apparatus to perform the method of one or more of Aspects 1-34.

Aspect 36: A device for wireless communication, comprising a memory and one or more processors coupled to the memory, the memory and the one or more processors configured to perform the method of one or more of Aspects 1-34.

Aspect 37: An apparatus for wireless communication, comprising at least one means for performing the method of one or more of Aspects 1-34.

Aspect 38: A non-transitory computer-readable medium storing code for wireless communication, the code comprising instructions executable by a processor to perform the method of one or more of Aspects 1-34.

Aspect 39: A non-transitory computer-readable medium storing a set of instructions for wireless communication, the set of instructions comprising one or more instructions that, when executed by one or more processors of a device, cause the device to perform the method of one or more of Aspects 1-34.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors coupled to the memory, the memory comprising instructions executable by the one or more processors to cause the UE to:
      obtain a discontinuous reception (DRX) short cadence value that corresponds to a number of Hertz (Hz);
      sleep as part of a DRX cycle; and
      wake up, starting at a subframe, based at least in part on the DRX short cadence value and a subframe identifier n of the subframe.

2. The UE of claim 1, wherein the subframe identifier n is equal to (10*a serial frame number of a frame comprising the subframe)+a subframe number of the subframe within the frame.

3. The UE of claim 2, wherein the memory further comprises instructions executable by the one or more processors to cause the UE to wake up if a first ceiling value of (n*the DRX short cadence value/1000)+1 is equal to a second ceiling value of (n+1)*(the DRX short cadence value/1000).

4. The UE of claim 3, wherein the memory further comprises instructions executable by the one or more processors to cause the UE to wake up a time duration after a beginning of the subframe, wherein the time duration includes a DRX start offset mod (floor(1000/the DRX short cadence value)).

5. The UE of claim 1, wherein the memory further comprises instructions executable by the one or more processors to cause the UE to wake up after a DRX slot offset from a beginning of the subframe.

6. The UE of claim 1, wherein the memory further comprises instructions executable by the one or more processors to cause the UE to wake up after a DRX start offset from a beginning of the subframe.

7. The UE of claim 1, wherein the memory further comprises instructions executable by the one or more processors to cause the UE to wake up after a DRX slot offset plus a DRX start offset from a beginning of the subframe.

8. The UE of claim 1, wherein the memory further comprises instructions executable by the one or more processors to cause the UE to leap a subframe before waking up starting at the subframe based at least in part on a duty cycle corresponding to the DRX short cadence value.

9. The UE of claim 1, wherein the memory further comprises instructions executable by the one or more processors to cause the UE to obtain the DRX short cadence value by receiving the DRX short cadence value from a base station.

10. The UE of claim 1, wherein the DRX short cadence value is at least one of 45 Hz, 48 Hz, 60 Hz, 75 Hz, 80 Hz, 90 Hz, or 120 Hz.

11. A base station for wireless communication, comprising:
    memory; and
    one or more processors coupled to the memory, the memory comprising instructions executable by the one or more processors to cause the base station to:
       prepare for communication with a user equipment (UE) according to a discontinuous reception (DRX) short cadence value that corresponds to a number of Hertz (Hz); and
       transmit, to the UE starting at a subframe, a data burst according to a DRX cycle that is based at least in part on the DRX short cadence value and a subframe identifier n of the subframe.

12. The base station of claim 11, wherein the subframe identifier n is equal to (10*a serial frame number of a frame comprising the subframe)+a subframe number of the subframe within the frame.

13. The base station of claim 12, wherein the memory further comprises instructions executable by the one or more processors to cause the base station to transmit the data burst starting at the subframe if a first ceiling value of (n*the DRX short cadence value/1000)+1 is equal to a second ceiling value of (n+1)*(the DRX short cadence value/1000).

14. The base station of claim 13, wherein the memory further comprises instructions executable by the one or more processors to cause the base station to transmit the data burst starting a time duration after a beginning of the subframe, wherein the time duration includes a DRX start offset mod (floor(1000/the DRX short cadence value)).

15. The base station of claim 11, wherein the memory further comprises instructions executable by the one or more processors to cause the base station to transmit the data burst based at least in part on a DRX slot offset from a beginning of the subframe.

16. The base station of claim 11, wherein the memory further comprises instructions executable by the one or more processors to cause the base station to transmit the data burst based at least in part on a DRX start offset from a beginning of the subframe.

17. The base station of claim 11, wherein the memory further comprises instructions executable by the one or more processors to cause the base station to transmit the data burst based at least in part on a DRX slot offset plus a DRX start offset from a beginning of the subframe.

18. The base station of claim 11, wherein the memory further comprises instructions executable by the one or more processors to cause the base station to leap a subframe before transmitting the data burst in the subframe based at least in part on a duty cycle corresponding to the DRX short cadence value.

19. The base station of claim 11, wherein the memory further comprises instructions executable by the one or more processors to cause the base station to transmit the DRX short cadence value to the UE.

20. A user equipment (UE) for wireless communication, comprising:
   memory; and
   one or more processors coupled to the memory, the memory comprising instructions executable by the one or more processors to cause the UE to:
      obtain a discontinuous reception (DRX) short cadence value that corresponds to a number of Hertz (Hz);
      sleep as part of a DRX cycle; and
      wake up, starting at a slot, based at least in part on the DRX short cadence value and a slot identifier k of the slot.

21. The UE of claim 20, wherein the slot identifier k is equal to ((10*a serial frame number of a frame comprising a subframe comprising the slot+a subframe number of the subframe within the frame)*slots per second)+a slot number of the slot within the subframe.

22. The UE of claim 21, wherein the waking up includes waking up if a first ceiling value of (k*the DRX short cadence value/(1000*slots per second))+1 is equal to a second ceiling value of (k+1)*(the DRX short cadence value/(1000*slots per second)).

23. The UE of claim 22, wherein the memory further comprises instructions executable by the one or more processors to cause the UE to wake up a time duration after a beginning of the subframe, wherein the time duration includes a DRX start offset mod (floor(1000/the DRX short cadence value)).

24. The UE of claim 20, wherein the memory further comprises instructions executable by the one or more processors to cause the UE to wake up after a DRX start slot offset from a beginning of the slot.

25. The UE of claim 20, wherein the memory further comprises instructions executable by the one or more processors to cause the UE to wake up starting at the slot based at least in part on a duty cycle corresponding to the DRX short cadence value.

26. The UE of claim 20, wherein the memory further comprises instructions executable by the one or more processors to cause the UE to obtain the DRX short cadence value by receiving the DRX short cadence value from a base station.

27. A base station for wireless communication, comprising:
   memory; and
   one or more processors coupled to the memory, the memory comprising instructions executable by the one or more processors to cause the base station to:
      prepare for communication with a user equipment (UE) according to a discontinuous reception (DRX) short cadence value that corresponds to Hertz (Hz); and
      transmit, to the UE starting at a slot, a data burst according to a DRX cycle that is based at least in part on the DRX short cadence value and a slot identifier k of the slot.

28. The base station of claim 27, wherein the slot identifier k is equal to ((10*a serial frame number of a frame comprising a subframe comprising the slot+a subframe number of the subframe within the frame)*slots per second)+a slot number of the slot within the subframe.

29. The base station of claim 28, wherein the memory further comprises instructions executable by the one or more processors to cause the base station to transmit the data burst starting at the slot if a first ceiling value of (k*the DRX short cadence value/(1000*slots per second))+1 is equal to a second ceiling value of (k+1)*(the DRX short cadence value/(1000*slots per second)).

30. The base station of claim 27, wherein the memory further comprises instructions executable by the one or more processors to cause the base station to transmit the data burst based at least in part on a DRX start slot offset from a beginning of the slot.

* * * * *